(12) United States Patent
Koo

(10) Patent No.: US 11,284,676 B2
(45) Date of Patent: Mar. 29, 2022

(54) SHOE HAVING A PARTIALLY COATED UPPER

(71) Applicant: John C. S. Koo, Los Angeles, CA (US)

(72) Inventor: John C. S. Koo, Los Angeles, CA (US)

( * ) Notice: Subject to any disclaimer, the term of this patent is extended or adjusted under 35 U.S.C. 154(b) by 347 days.

(21) Appl. No.: 15/846,046

(22) Filed: Dec. 18, 2017

(65) Prior Publication Data

US 2018/0103728 A1    Apr. 19, 2018

Related U.S. Application Data

(63) Continuation of application No. 13/495,803, filed on Jun. 13, 2012, now abandoned.

(51) Int. Cl.
| | | |
|---|---|---|
| *A43D 8/16* | (2006.01) | |
| *B05D 1/02* | (2006.01) | |
| *B41M 3/00* | (2006.01) | |
| *B44C 3/02* | (2006.01) | |
| *B33Y 80/00* | (2015.01) | |
| *A43B 3/00* | (2006.01) | |

(Continued)

(52) U.S. Cl.
CPC ............... *A43D 8/16* (2013.01); *B05D 1/02* (2013.01); *B33Y 80/00* (2014.12); *B41M 3/00* (2013.01); *B44C 3/025* (2013.01); *A43B 1/0027* (2013.01); *A43B 3/0078* (2013.01); *A43B 3/0084* (2013.01); *A43B 13/02* (2013.01); *A43B 13/122* (2013.01); *A43B 23/0205* (2013.01); *A43B 23/027* (2013.01); *A43B 23/0235* (2013.01); *A43B 23/24* (2013.01); *A43D 8/22* (2013.01); *B05D 1/26* (2013.01); *B05D 5/06* (2013.01); *B05D 5/061* (2013.01); *B05D 7/02* (2013.01); *B05D 7/12* (2013.01)

(58) Field of Classification Search
CPC .......... A43D 8/16; A43D 8/22; A43B 3/0078; A43B 23/0205; A43B 1/0027; A43B 23/0235; A43B 23/027; A43B 13/122; A43B 23/24; A43B 3/0084; A43B 13/02; B41M 3/00; B05D 1/02; B05D 5/06; B05D 7/12; B05D 7/02; B05D 5/061; B05D 1/26; B33Y 80/00; B44C 3/025
See application file for complete search history.

(56) References Cited

U.S. PATENT DOCUMENTS

| | | |
|---|---|---|
| 123,450 A | 2/1872 | Bryant |
| 140,241 A | 6/1873 | Bryant |

(Continued)

FOREIGN PATENT DOCUMENTS

| | | |
|---|---|---|
| CN | 98234514 | 6/1998 |
| CN | 2353190 Y | 12/1999 |

(Continued)

OTHER PUBLICATIONS

DTG Printer's Sneakers Attachment, https://www.youtube.com/watch?v=re652JsKbWU, Jun. 5, 2011.*

(Continued)

*Primary Examiner* — James M Mellott
(74) *Attorney, Agent, or Firm* — Joseph G. Swan, P.C.

(57) ABSTRACT

Provided is a shoe that includes a sole and an upper extending above the sole. The upper has an outer surface and is made of a base material that is partially covered with a coating material, such that the coating material covers at least 90% but not more than 98% of the outer surface of the upper.

20 Claims, 17 Drawing Sheets

(51) Int. Cl.

| | |
|---|---|
| *A43B 23/02* | (2006.01) |
| *A43B 1/00* | (2006.01) |
| *B05D 1/26* | (2006.01) |
| *B05D 7/12* | (2006.01) |
| *B05D 7/02* | (2006.01) |
| *B05D 5/06* | (2006.01) |
| *A43B 13/02* | (2006.01) |
| *A43B 13/12* | (2006.01) |
| *A43D 8/22* | (2006.01) |
| *A43B 23/24* | (2006.01) |

(56) References Cited

U.S. PATENT DOCUMENTS

| | | |
|---|---|---|
| 384,483 A | 6/1888 | Walters |
| 1,395,958 A | 11/1921 | Hamilton |
| 1,716,790 A | 6/1929 | Mitchell |
| 1,811,803 A | 6/1931 | Oakley |
| 1,978,030 A | 10/1934 | Ritchie |
| 1,989,467 A | 1/1935 | Schaffer |
| 2,075,229 A | 3/1937 | Rose |
| 2,121,678 A | 6/1938 | Armor |
| 2,248,131 A | 7/1941 | Smith |
| 2,250,987 A | 7/1941 | Dunbar |
| 2,287,282 A | 6/1942 | Tousley |
| 2,371,689 A | 11/1942 | Gregg et al. |
| 2,333,303 A | 11/1943 | Enos |
| 2,362,378 A | 11/1944 | Holbrook et al. |
| 2,393,433 A | 1/1946 | V'Soske |
| 2,393,434 A | 1/1946 | V'Soske |
| 2,400,487 A | 5/1946 | Clark |
| 2,426,524 A | 8/1947 | Rosenbarger |
| 2,427,882 A | 9/1947 | Schulte |
| 2,550,354 A | 4/1951 | Jacobsen |
| 2,570,949 A | 10/1951 | Hoffenberg |
| 2,640,283 A | 6/1953 | McCord |
| 2,663,097 A | 12/1953 | Giese |
| 2,732,065 A | 1/1956 | Marchese |
| 2,736,926 A | 3/1956 | Johnson |
| 2,793,136 A | 5/1957 | Root |
| 2,850,214 A | 9/1958 | Rooney, Jr. |
| 3,007,205 A | 11/1961 | House |
| 3,027,661 A | 4/1962 | McCord |
| 3,303,250 A | 2/1967 | Bingham, Jr. |
| 3,493,418 A | 2/1970 | Amano |
| 3,543,420 A | 12/1970 | Dassler |
| 3,555,697 A | 1/1971 | Dassler |
| 3,629,051 A | 12/1971 | Mitchell |
| 3,698,357 A | 10/1972 | Spencer |
| 3,776,753 A | 12/1973 | Habib |
| 3,798,048 A | 3/1974 | Brody et al. |
| 3,824,715 A | 7/1974 | Vaughan et al. |
| 3,888,026 A | 6/1975 | Dassler |
| 3,918,181 A | 11/1975 | Inohara |
| 4,007,549 A | 2/1977 | Moore |
| 4,021,860 A | 5/1977 | Swallow et al. |
| 4,055,699 A | 10/1977 | Hsiung |
| 4,089,069 A | 5/1978 | Vistins |
| 4,108,452 A | 8/1978 | Baron |
| 4,151,662 A | 5/1979 | Vistins |
| 4,160,331 A | 7/1979 | Bell |
| 4,172,293 A | 10/1979 | Vistins |
| 4,174,415 A | 11/1979 | Bethe |
| 4,205,921 A | 6/1980 | Mahler |
| 4,217,704 A | 8/1980 | Whitaker |
| 4,250,306 A | 2/1981 | Lask et al. |
| 4,345,702 A | 8/1982 | Wolfe |
| 4,356,643 A | 11/1982 | Kester et al. |
| 4,374,460 A | 2/1983 | Towsend |
| 4,405,730 A | 9/1983 | Cohen |
| 4,489,510 A | 12/1984 | Williams |
| 4,497,871 A | 2/1985 | Henke |
| 4,501,077 A | 2/1985 | Young |
| 4,519,148 A | 5/1985 | Sisco |
| 4,535,121 A | 8/1985 | Oezelli et al. |
| 4,554,749 A | 11/1985 | Ostrander |
| 4,640,858 A | 2/1987 | Barnett |
| 4,658,514 A | 4/1987 | Shin |
| 4,702,021 A | 10/1987 | Cameron |
| 4,779,360 A | 10/1988 | Bible |
| 4,825,564 A | 5/1989 | Sorce |
| RE33,018 E | 8/1989 | Ostrander |
| 4,879,969 A | 11/1989 | Haranoya et al. |
| 4,899,411 A | 2/1990 | Johnson et al. |
| 4,924,608 A | 5/1990 | Mogonye |
| 4,963,392 A | 10/1990 | Molnar et al. |
| 4,963,422 A | 10/1990 | Katz et al. |
| 5,038,500 A | 8/1991 | Nicholson |
| 5,082,711 A | 1/1992 | Goerens |
| 5,108,777 A | 4/1992 | Laird |
| 5,173,325 A | 12/1992 | Knobbe et al. |
| 5,259,125 A | 11/1993 | Gromes |
| 5,263,233 A | 11/1993 | Kim et al. |
| 5,276,981 A | 1/1994 | Schaffer et al. |
| 5,290,607 A | 3/1994 | Chitouras |
| 5,403,638 A | 4/1995 | Yanagizawa et al. |
| 5,403,884 A | 4/1995 | Perlinski |
| 5,425,186 A | 6/1995 | Hoyt |
| 5,485,687 A | 1/1996 | Rohde |
| 5,694,704 A | 12/1997 | Kasbrick |
| 5,799,418 A | 9/1998 | Davis |
| 5,921,005 A | 7/1999 | Bell et al. |
| 5,928,731 A | 7/1999 | Yanagida et al. |
| 5,977,014 A | 11/1999 | Plischke et al. |
| 6,055,748 A | 5/2000 | Harrison |
| 6,096,382 A | 8/2000 | Gueret |
| 6,106,920 A | 8/2000 | Pichon et al. |
| 6,182,377 B1 | 2/2001 | Toensing |
| 6,214,141 B1 | 4/2001 | Kim et al. |
| 6,243,973 B1 | 6/2001 | Lind |
| 6,255,235 B1 | 7/2001 | Hiraoka et al. |
| 6,283,664 B1 | 9/2001 | Gueret |
| 6,306,498 B1 | 10/2001 | Yuuki et al. |
| 6,430,844 B1 | 8/2002 | Otis |
| 6,561,606 B1* | 5/2003 | Yoshida ............... B41J 25/308 347/8 |
| 6,660,205 B1 | 12/2003 | Harkins, Sr. |
| 6,900,547 B2 | 5/2005 | Polk Jr. et al. |
| 6,913,784 B2 | 7/2005 | Xue et al. |
| 7,516,506 B2 | 4/2009 | Koo et al. |
| 7,767,600 B1* | 8/2010 | Figueroa ............... D06Q 1/10 442/149 |
| 7,827,640 B2 | 11/2010 | Koo et al. |
| 7,951,258 B2 | 5/2011 | Karlsson et al. |
| 2002/0080375 A1* | 6/2002 | Waldner ............... H04N 1/502 358/1.9 |
| 2002/0112379 A1 | 8/2002 | Sussmann et al. |
| 2002/0157281 A1 | 10/2002 | Safdeye et al. |
| 2003/0121179 A1 | 7/2003 | Chen |
| 2003/0171049 A1 | 9/2003 | Arnold et al. |
| 2003/0175417 A1 | 9/2003 | Trevisan |
| 2003/0199220 A1 | 10/2003 | Dawson et al. |
| 2004/0091784 A1 | 5/2004 | Frederiksson et al. |
| 2004/0163190 A1 | 8/2004 | Loughran |
| 2004/0194341 A1 | 10/2004 | Koo |
| 2004/0194345 A1 | 10/2004 | Koo |
| 2005/0126676 A1 | 6/2005 | Karlsson et al. |
| 2006/0119662 A1* | 6/2006 | Lai ............... B41J 2/1628 347/44 |
| 2007/0098898 A1* | 5/2007 | Wu ............... D06Q 1/00 427/256 |
| 2008/0189824 A1 | 8/2008 | Rock et al. |
| 2008/0230942 A1 | 9/2008 | Koo |
| 2010/0011562 A1 | 1/2010 | Cauley et al. |
| 2010/0095956 A1 | 4/2010 | Kim |
| 2010/0125356 A1* | 5/2010 | Shkolnik ............... G06T 5/006 700/98 |
| 2011/0109686 A1* | 5/2011 | McDowell ........... A43B 3/0078 347/20 |
| 2011/0159272 A1 | 6/2011 | Yue et al. |
| 2011/0249298 A1* | 10/2011 | Gullentops ............ B33Y 50/00 358/1.18 |

(56) References Cited

U.S. PATENT DOCUMENTS

FOREIGN PATENT DOCUMENTS

| EP | 0516874 A1 | 12/1992 |
|---|---|---|
| EP | 1405723 A | 4/2004 |
| EP | 1681389 A | 7/2008 |
| GB | 687442 A | 2/1953 |
| GB | 0886222 | 1/1962 |
| GB | 1443331 | 7/1976 |
| GB | 1559881 A | 1/1980 |
| GB | 2 201 082 | 8/1988 |
| JP | S59-362 | 1/1984 |
| JP | S61-225380 | 10/1986 |
| JP | 62071695 | 4/1987 |
| JP | H3-170101 | 7/1991 |
| JP | 2003166149 A | 6/2003 |
| JP | 2000308501 | 11/2007 |
| JP | 2009114572 A | 5/2009 |
| JP | 2011250873 A | 12/2011 |
| JP | 2012025722 A | 2/2012 |
| WO | WO2001/26863 | 4/2001 |
| WO | WO2004042847 | 5/2004 |
| WO | WO2006033621 A | 3/2006 |

OTHER PUBLICATIONS

Google Search, https://www.google.com/search? sequin logo shoe date limited prior to Jun. 13, 2011.*
Angryredhead, Customize Shoes With Spray Paint and Sugru, found at https://www.instructables.com/Super-Angry-Unapologetic-Scorch-the-Earth-Shoes-/; Viewed and printed on Jan. 28, 2021 and based on comments posted 10 years prior this document was publicly available at least on Jan. 28, 2011.*
Prosecution history of parent U.S. Appl. No. 13/495,803.
Prosecution history of U.S. Appl. No. 14/093,706.
Prosecution history of U.S. Appl. No. 11/866,289 (now U.S. Pat. No. 7,846,493).
International Search Report and Written Opinion of the International Searching Authority in corresponding PCT application PCT/US07/69410, dated Aug. 14, 2008.
Prosecution history of U.S. Appl. No. 11/751,581 (now U.S. Pat. No. 7,516,506).
Prosecution history of U.S. Appl. No. 12/408,702 (now U.S. Pat. No. 7,827,640).
Prosecution history of U.S. Appl. No. 12/898,550 (now U.S. Pat. No. 8,234,736).
Prosecution history of U.S. Appl. No. 13/543,858.
Prosecution history of U.S. Appl. No. 10/438,375 (now U.S. Pat. No. 7,191,549).
Prosecution history of U.S. Appl. No. 11/674,668.
Prosecution history of U.S. Appl. No. 12/912,722 (now U.S. Pat. No. 8,647,460).
Prosecution history of U.S. Appl. No. 12/912,729 (now U.S. Pat. No. 8,808,487).
Prosecution history of U.S. Appl. No. 11/530,419 (now U.S. Pat. No. 8,661,713).
Chapter 64 of the Harmonized Tariff Schedule of the United States (2012), showing certain duty advantages based on the nature of the surface of the shoe's upper, particularly section 6402 beginning on p. 64-6.

* cited by examiner

SHOE HAVING A PARTIALLY COATED UPPER

FIELD OF THE INVENTION

The present invention pertains to footwear, particularly shoes, shoe components, and techniques for manufacturing shoes and their components.

BACKGROUND

A variety of different techniques for decorating shoes currently exist. However, improvements are always desirable, particularly where visually pleasing decorative elements can be applied at a relatively low cost.

SUMMARY OF THE INVENTION

The present invention addresses this need by providing shoes and shoe components having their outer surfaces fully or partially coated with a coating material, as well as to methods and techniques for applying such coating materials.

Thus, one embodiment of the invention is directed to a shoe that includes a sole and an upper extending above the sole. The upper has an outer surface and is made of a base material that is partially covered with a coating material, such that the coating material covers at least 90% but not more than 98% of the outer surface of the upper.

According to another embodiment, the shoe includes a sole and an upper extending above the sole. The upper is made of a base material that is entirely or almost entirely covered with a coating material, e.g., 150-300μ thick.

According to another embodiment, the shoe includes a sole and an upper extending above the sole. The sole is made of a base material that is at least partially covered with a coating material.

In many of the preferred embodiments, the present invention concerns methods for applying a coating material to an existing (e.g., mass-produced or otherwise pre-manufactured) product (such as a sheet material or a largely finished, usable consumer item), as well as to products that have been made using such techniques. Such approaches can be thought of as hybrid manufacturing, using both conventional mass-production techniques and (potentially customized) application of one or more layers of coating material to complete (or at least further) the final product. In certain embodiments, the coating material is identical or molecularly compatible with the surface base material of the existing product, so that application of the coating material essentially builds up or extends portions of the existing product in a desired way. In any event, such techniques often can allow for rapid customization of existing products and/or, by sensing and adapting to surface variations and other non-uniformities resulting from other aspects of the mass-production process, can even facilitate mass production of a product having a single design. In many cases, the existing products to which such coating material(s) are applied will be fairly generic items, with the customization and/or design being applied entirely, substantially entirely, predominantly or in significant part using the techniques of the present invention.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Figure 1:
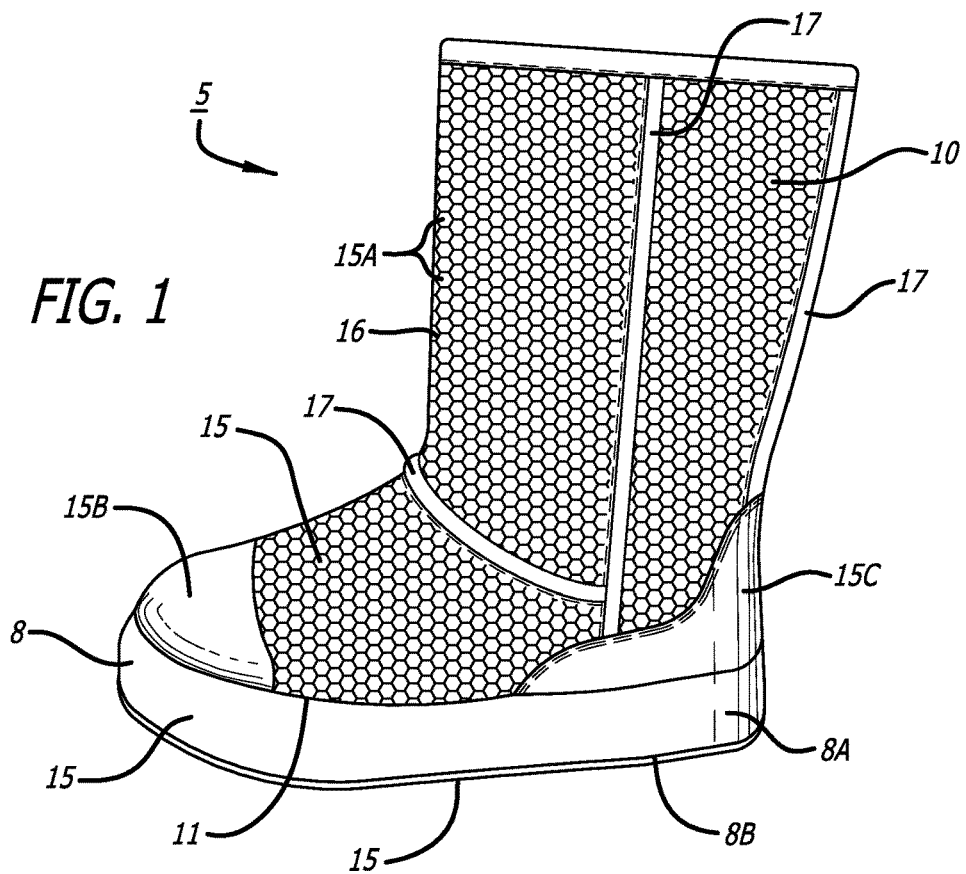
FIG. 1 is a left side elevational view of a shoe according to a first representative embodiment of the present invention.

FIG. 1 illustrates a shoe 5 according to a representative embodiment of the present invention. Although shoe 5 typically would be considered a boot, it should be understood that it is just one example of a shoe, and the present invention applies to all kinds of shoes, including, e.g., dress shoes, athletic shoes, casual shoes and sandals. As shown in FIG. 1, shoe 5 includes a sole 8, an upper 10 extending upwardly from sole 8, and a seam 11 between sole 8 and upper 10. As used herein, the sole refers to the portion of the shoe that underlies the wearer's foot, and it typically includes an outsole and an insole, and may also include a midsole, a shank, additional cushioning elements (e.g., using air, other gasses or foamed solids), and/or any other conventional components. In the embodiment shown in FIG. 1, the sole 8 provides the entire bottom surface of shoe 5. However, in alternate embodiments a separate heel is attached to the rear portion of sole 8, such as by gluing, or a separate heel can be integrally formed with sole 8. In such a case, the bottom surface of the heel typically is identical to, substantially the same as, or at least very similar to the bottom surface of sole 8, e.g., made of the same type(s) of material(s) and/or having a similar surface texture. Preferably, sole 8 is made from ethylene vinyl acetate (EVA), polyvinyl chloride (PVC), thermoplastic rubber (TPR), any other plastic, and/or any other natural or synthetic leather or rubber. However, it instead can be made from any other known material. Also, sole 8 can be made up of any number of layers of material.

Upper 10 preferably is made from an underlying base sheet material 12, such as natural or synthetic leather, canvas or any other material from which conventional shoe uppers are made, covered (across some or all of its outer surface areas) by a second (or coating) material 15 that typically is significantly different than the base material 12. However, in certain embodiments the coating material 15 is the same type of material as the upper 10 but is more decorative in nature. In the present embodiment, this coating material 15 is (or comprises) a plastic, a polymer, or a natural or synthetic rubber. It should be noted that wherever the present description refers to a coating material 15, such references could refer to a single type of coating material 15 or multiple different types of material that together comprise coating material 15. For example, materials having different colors and/or different compositions may be used at different locations on the upper 10 (or other portions of the shoe 5), in order to achieve any desired functional and/or aesthetic effects, and all such materials together would then be considered the coating material 15.

FIG. 1 illustrates two ways in which coating material 15 has been applied to the upper 10. On most portions of upper 10, coating material 15 has been applied as a pattern of small hexagons 15A, with small gaps 16 between adjacent hexagons 15A, where base sheet material 12 is exposed. More generally, in certain embodiments it is desirable for the coating material 15 to be applied over a relatively large portion of the outer surface of the upper 10, e.g., at least 30-70% of such outer surface area or at least 20-100 square centimeters ($cm^2$), as a pattern of closely spaced discrete design elements (e.g., with gaps between adjacent design elements of less than 1,000, 500, 200 or 100 microns, µ). The individual design elements preferably are small (e.g., having dimensions of at least 1-3, but no more than 5-15 millimeters, mm, across), at least in width (e.g., using elongated design elements), so as to maximize flexibility and breathability of the upper 10. However, it also should be noted that in certain embodiments there are no gaps between the small design elements (e.g., hexagons 15A) where the base material 12 is visible; instead, e.g., in alternate embodiments such small design elements overlap each other, or the boundaries (e.g., lines) between them are simply design features or constitute a thinner amount of coating material 15 but such that the base material 12 remains covered and not visible. In fact, in certain embodiments the base material 12 is completely covered (e.g., with overlapping small design elements), or the uncovered portions (e.g., up to 10% or in some cases up to almost 50%) may be distributed in any desired manner (e.g., spread throughout the upper shaft or located at selected areas to increase breathability).

A wide variety of other patterns may be used in accordance with the present invention. For example, the regular, repeating pattern of small hexagons 15A can be replaced with any other repeating or non-repeating, regular or irregular pattern of any desired shapes, using geometric shapes (such as other kinds of polygons, circles, discs, or ovals) or non-geometric shapes (such as flowers, airplanes or arbitrary shapes). One advantage of using polygons, especially regular polygons (i.e., all sides having equal length and all angles being equal), is that it can be relatively easy to provide a large number of very small gaps or openings 16 (or else, e.g., boundaries of thinner coating material 15) between them. In this regard, providing a large number of small (or even microscopic) openings (such as the spaces 16 between adjacent small hexagons 15A) often is desirable, e.g., to enhance breathability and/or flexibility of the overall shoe upper 10. Providing boundaries of thinner coating material 15 (rather than gaps or openings 16) also can increase flexibility, but often will not be able to provide increased breathability.

In addition, on the front portion 15B (corresponding to the toe portion) and rear portion 15C (corresponding to the heel portion) of shoe 5, coating material 15 has been applied so as to fully cover base sheet material 12 (i.e., in a continuous gap-free manner) across a relatively large surface area (e.g., having an aggregate area of at least 10-30% of the total outside surface area of the upper 10 or at least 10-30 cm$^2$). In certain embodiments, it is desirable to use different colors and/or thicknesses of the coating material 15 for different design features (e.g., element 15B as compared to element 15C), e.g., in order to create the look and/or feel that different materials have been used.

In the preferred embodiments, the upper 10 is comprised of a number of different components that have been stitched together along seam strips 17. More preferably, stitched seams 17 have not been coated with material 15, but instead constitute elongated strips where the underlying sheet material 12 remains visible. In order to manufacture an upper 10 with these properties, in the preferred embodiments the desired patterns of coating material 15 are deposited onto a continuous flat sheet of the base material 12 (e.g., using any of the techniques described herein), leaving an uncoated margin which will serve as the seam strips 17, the individual components are then cut from this sheet material 12 along the outer edges of such margins, and such components are stitched together to form the entire upper 10. It is noted that this approach also can provide maximum efficiency, e.g., by using the coating material 15 only where necessary and by ensuring that other portions of the base material 12 are not coated and, therefore, can be gathered up and easily recycled and/or reused. Similarly, any of the coating material 15 that does not become part of the shoe 5 (e.g., the portions that are blown off or vacuumed up) also can be recycled and/or reused.

In the present embodiment, the sidewalls 8A of shoe sole 8 (i.e., the portions that are orthogonal, or approximately orthogonal, to the bottom surface 8B of sole 8) are completely covered with the coating material 15, e.g., to provide a decorative pattern (e.g., either a smooth pattern of approximately uniform thickness or a three-dimensional pattern in which some areas are thicker than others). However, in alternate embodiments such sidewalls are only partially coated or are completely uncoated with coating material 15.

Also, in certain embodiments the bottom surface 8B of shoe sole 8 (i.e., the bottom surface of the outsole) is partially (not shown) or completely (shown in FIG. 1) covered with coating material 15. Preferably, the amount of coverage is dependent upon the base material that is used for the bottom surface of the outsole.

For example, when the bottom surface 8B of the outsole is made of a natural fabric, leather or other natural material, it often will be desirable to provide a certain amount of coverage using coating material 15, for decorative and/or functional purposes. However, for import duty purposes and/or for the functional advantages of providing a composite surface (e.g., having different gripping properties under different conditions), it generally will be desirable to limit the coverage of coating material 15 to less than 50% of the entire surface area (or at least the entire surface area that contacts the ground, or contacts a flat floor, in ordinary use of the shoe 5) of the outsole. On the other hand, for example, particularly when the base material 12 is a conventional synthetic shoe-sole material (such as EVA, PVC or TPR) and the coating material 15 is (or predominately comprises) a natural material, it often will be desirable for the coating material 15 to constitute at least (or more than 50%) of such outsole surface area.

It should be noted that a variety of different embodiments of the present invention can be implemented in which any or all of the upper 10, the sidewalls of the sole 8 and/or the bottom surface of the sole 8, either in whole or in part, is/are covered by the coating material 15, and all such combinations are intended to be within the scope of the present disclosure. As already indicated, specific decisions in this regard can be motivated by aesthetic and/or functional considerations.

Figure 2:
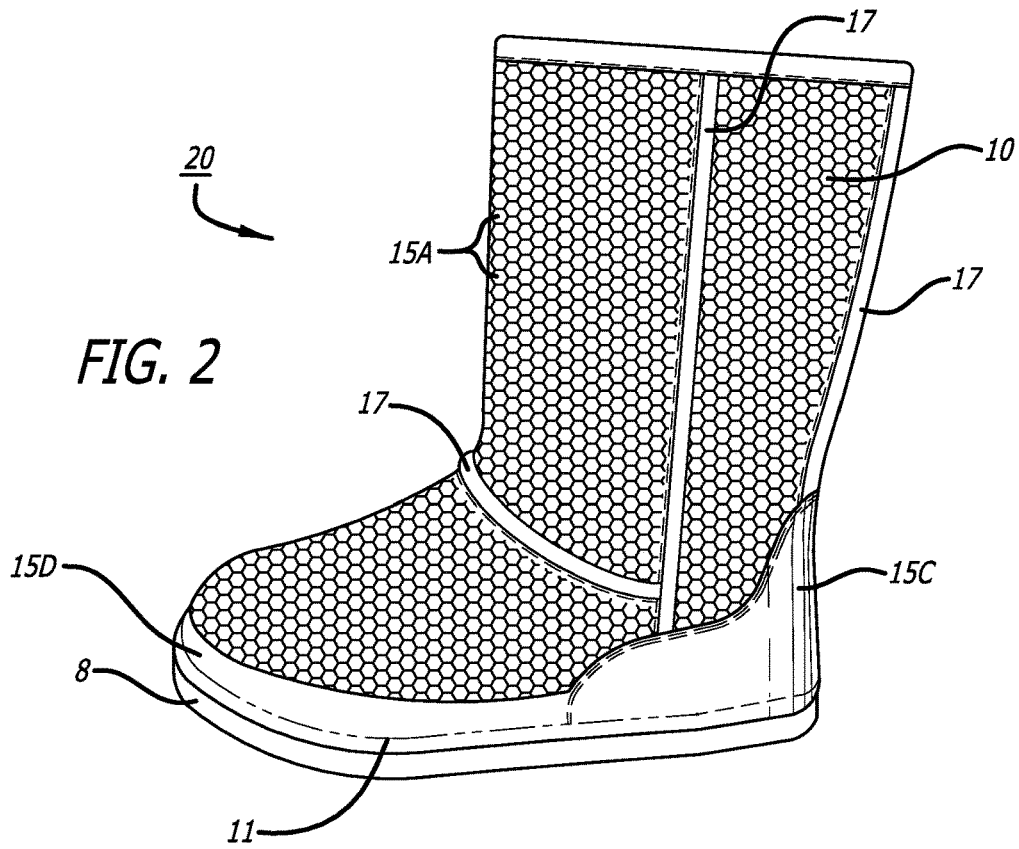
FIG. 2 is a left side elevational view of a shoe according to a second representative embodiment of the present invention.

FIG. 2 illustrates an alternate pattern in which coating material 15 has been applied to a shoe 20 that is similar to shoe 5, except as follows. As in the previous example, most of the shoe 20 is covered by the small hexagons 15A, the rear portion 15C of shoe 20 has been fully covered with the coating material 15, and stitched seams 17 have not been coated at all (or, in alternate embodiments, have been provided with a thinner coating). Unlike the previous example, however, on shoe 20 a band 15D of the coating material 15 has been applied so as to cover at least a top strip of sole 8, a bottom strip of upper 10, and the seam 11 between sole 8 and upper 10. In the present embodiment, band 15D can not only provide an aesthetically pleasing detail, but also can function to help keep the wearer's foot dry when walking through small puddles and the like, by sealing seam 11 and providing a waterproof layer of the coating material 15 that covers the lower portion of upper 10 around the entire periphery of the shoe 20. Band 15D can have any of a variety of different widths, depending upon the desired effect, such as 2-3 mm (e.g., if one wanted to use the minimum width to seal the seam 11) or 5-20 mm (e.g., for any desired visual effect).

Figure 3:
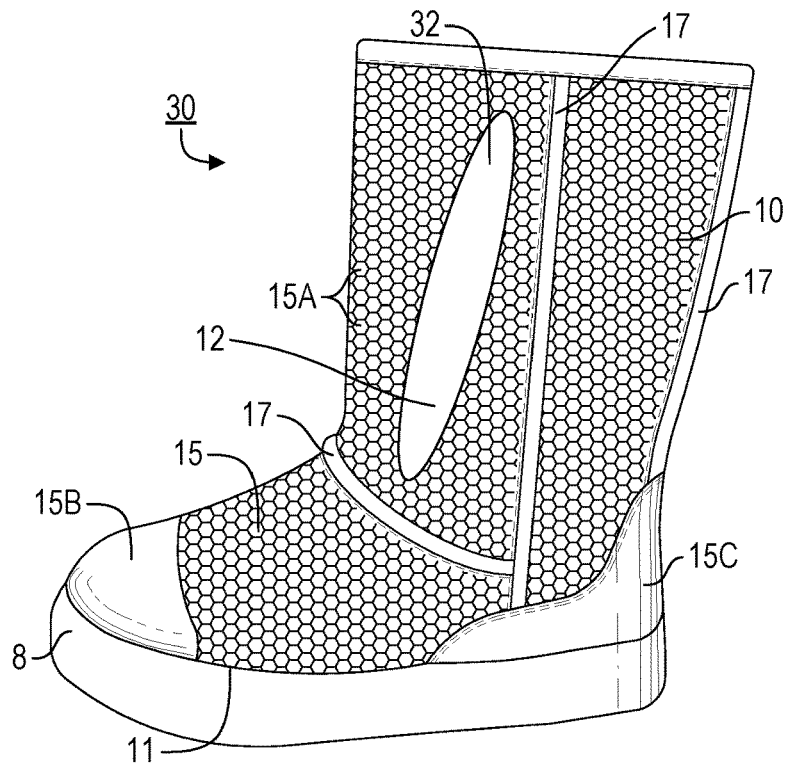
FIG. 3 is a left side elevational view of a shoe according to a third representative embodiment of the present invention.
Figure 4:
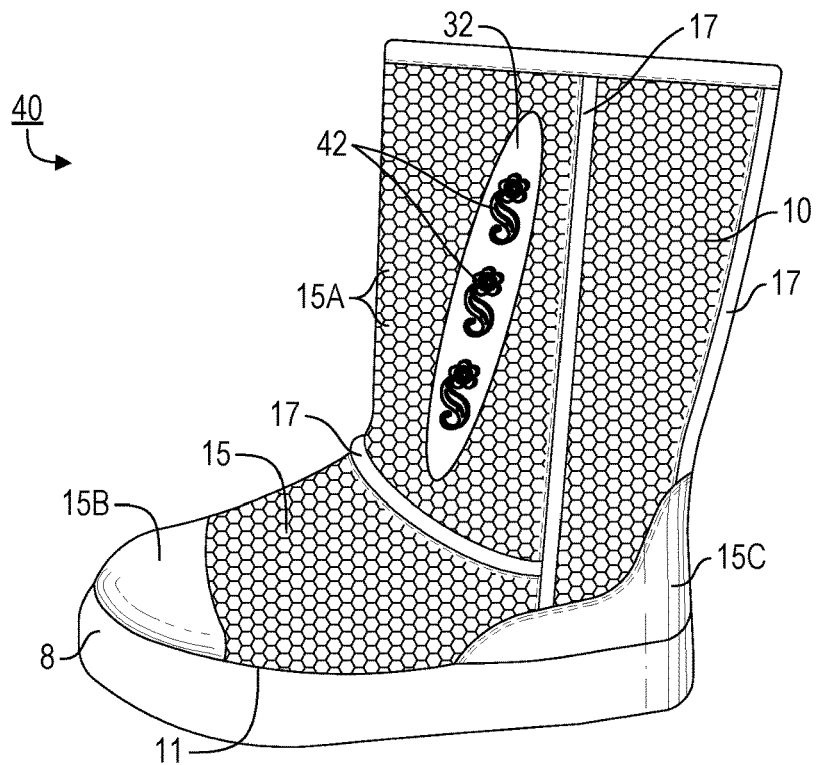
FIG. 4 is a left side elevational view of a shoe according to a fourth representative embodiment of the present invention.
Figure 5:
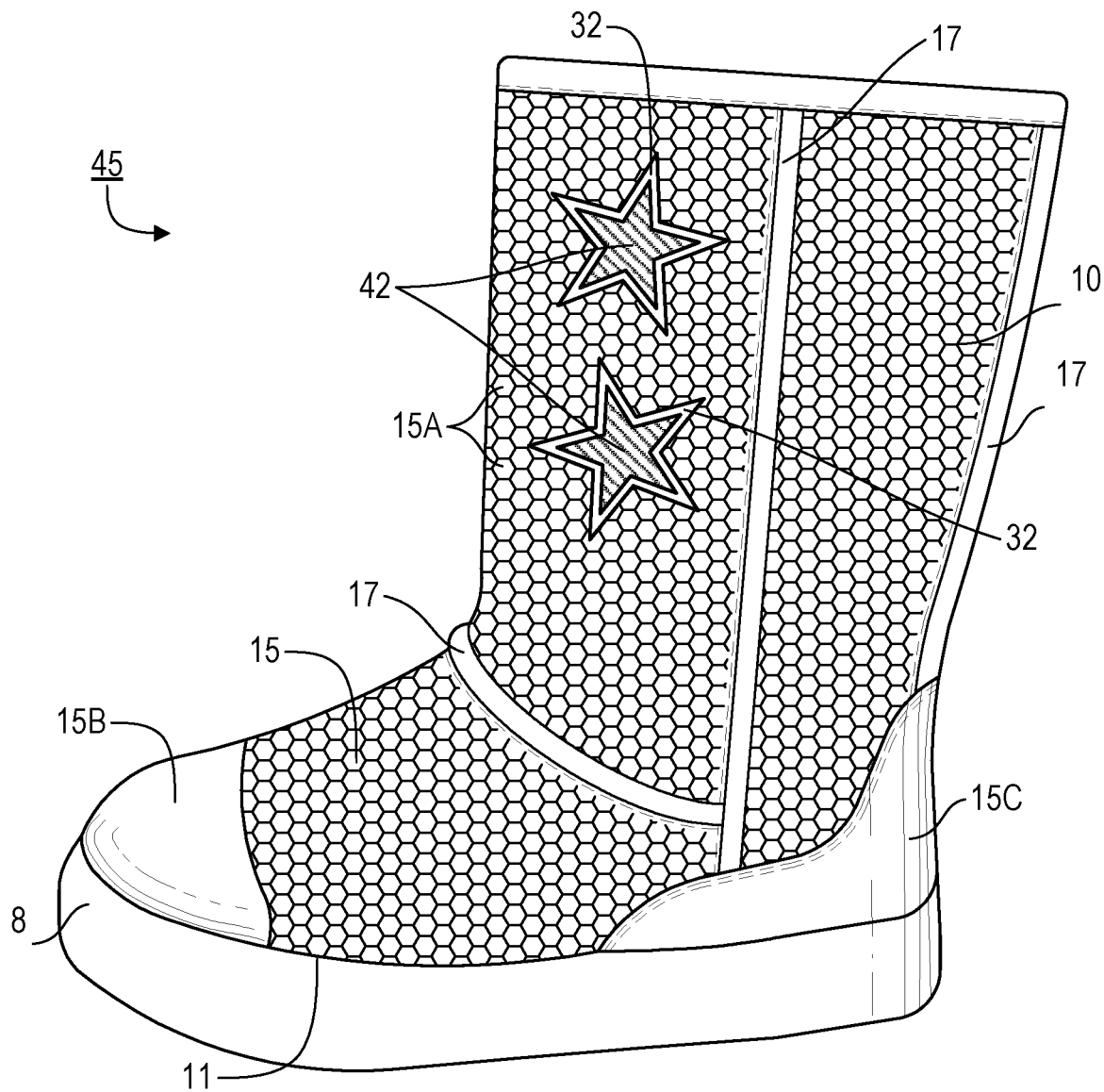
FIG. 5 is a left side elevational view of a shoe according to a fifth representative embodiment of the present invention.

FIG. 3 illustrates another pattern in which coating material 15 has been applied to a shoe 30. In addition to the features provided by shoe 5, shoe 30 also has a large area 32 that is not covered by the coating material 15, i.e., where base sheet material 12 remains visible. This area 32 can be left as is or, in alternate embodiments, such as with shoe 40 shown in FIG. 4, one or more decorative items 42 can be attached to the base sheet material 12 (e.g., sewn and/or glued on). Alternatively, as with shoe 45 in FIG. 5, the area 32 that is not covered by the coating material 15 can be formed so as to closely conform to the contours of the decorative items 42 (e.g., leaving just a small, perhaps barely visible, margin), for visual effect and/or to help the manufacturer or assembler know precisely where to attach the decorative items 42. As a further alternative, the decorative items 42 can be applied as additional coating material 15 (possibly using different colors, types of material and/or thicknesses), thereby further reducing costs.

It should be understood that the foregoing patterns of coating material are merely exemplary. In some embodiments, many very small openings (e.g., less than 50-1,000μ across) where the base material 12 is not covered with the coating material 15 are provided, and in other embodiments some or all of such openings are much larger (e.g., at least 2-5 mm across), either with or without attaching separate items onto the portion of the base material 12 corresponding to such larger openings. Moreover, any of such openings may be replaced with channels, regions, points, etc., where the coating material 15 is thinner but still covers the base material 12 so that the latter is not visible. Still further, most or all of the entire upper can be completely covered by the coating material 15, e.g., so that no (or almost no) portion of base sheet material 12 remains visible. Similarly, any number of larger areas 32 not covered by the coating material 15, having any desired shapes, also can be provided.

As discussed in greater detail below, the techniques of the present invention generally allow arbitrary applications of the coating material 15, either onto the completed shoe and/or onto any of the component parts of the shoe before they are assembled together. In addition, using techniques of the present invention, the application of the coating material 15 typically can be precisely controlled, e.g., as to thickness, shape boundaries and distances between shapes, in order to achieve any desired functional and/or aesthetic effects. For example, by providing a large number of very small gaps, having widths of at least twice the thickness of the coating material 15, but otherwise as small as possible, a combination of maximum flexibility, breathability and surface uniformity often can be achieved. Alternatively, rather than actual gaps, in certain embodiments there are provided pattern lines (of any shape or curvature) and/or regions in which the coating material 15 is thinner, thereby still providing a desired degree of flexibility. More generally, a variety of different shapes and thickness patterns can be used to provide specific localized flexibility.

For this reason and to conserve the coating material 15, in many of the preferred embodiments, the coating material 15 is provided as a very thin layer, e.g., having a median or mean thickness of less than 100-2,000μ in all or a majority of the locations where it has been applied, and it can be even thinner along pattern lines and other regions where localized flexibility is desired and/or where the appearance of separate design elements is desired, but where complete or near-complete coverage is beneficial. At the same time, in many embodiments the coating material is at least 50-200μ thick. Preferred ranges of mean or median thickness are between 100-500μ or between 150-400μ, where such coverage encompasses more than 50% or more than 90% of the desired shoe component (upper 10, entire outer surface of shoe 5, or entire outer surface of shoe 5 other than the bottom surface of sole 8). In this regard, although mainly illustrated in FIGS. 1-5 as being applied to the upper 10, the coating material 15 instead (or in addition) can be applied to any other portion of a shoe, such as the bottom and/or side of the sole 8 and/or heel. That is, references herein to the base material 12 could refer to the base material for any (typically external, visible) portion of a shoe 5. Particularly when applied to the outsole or heel (particularly the bottom surface of the outsole or heel), but also in many embodiments when applied to the upper 10, the coating material 15 preferably is sufficiently compatible with the base material 12 that the two permanently bond together in an integral manner.

For embodiments in which the upper 10 is coated, preferably at least (or more than) 90% (or 50% in some embodiments) of the outside surface area of the entire upper 10 is covered with the coating material 15. However, there preferably are a number of openings or other areas that remain uncoated (e.g., less than 92-98% coverage), e.g., to increase breathability and flexibility and/or to facilitate stitching together the different pieces that make up the upper 10. Moreover, for similar reasons, these uncovered areas of the upper 10 preferably are distributed across the surface area of upper 10, e.g., rather than being disposed just at the peripheral edges.

A variety of different design elements can be formed onto the outer surface of upper 10 (or any other portion of the shoe 5) in accordance with the present invention. Examples include sequin-like structures; faux zippers, eyelets or stitching; and/or various letters, numbers, characters, symbols, logos or pictures (e.g., scenery or animals).

The following discussion concerns various techniques for applying different kinds of surface coating materials 15. For ease of reference, each general approach is discussed in its own separate section, as indicated by that section's heading. For further ease of reference, the following discussions generally refer to exemplary shoe 5, although in most cases the discussion could apply to any of the other exemplary shoes (e.g., 20, 30, 40 or 45) mentioned herein or, in fact, to any other shoes that can be made in accordance with the present invention.

Liquid Deposition.

One approach to applying a surface coating material 15 according to the present invention is to spray, extrude or otherwise deposit very finely controlled amounts of a plastic, a polymer or another type of material, such as acrylonitrile butadiene styrene (ABS), a polycarbonate (PC), a PC-ABS blend, or polyphenylsulfone (PPSU), in a liquid form, onto the desired surface of the base material 12 portion of the shoe's upper 10 (or other desired component of the shoe 5). In the preferred embodiments, the coating material 15 is applied as a pattern of very small droplets (e.g., less than 1,000, 500, 300, 200, 100 or 50μ in diameter) or otherwise is applied in a manner to achieve such spatial resolutions.

The following discussion refers to a substrate 62 which preferably is the base material 12 mentioned above and thus is either part of a shoe 5 or is a component (e.g., in sheet material form) that is subsequently used to manufacture part of the shoe 5 (e.g., upper 10). In some embodiments, the coating material 15 is applied as just a surface coating that is relatively lightly bonded to the base material 12. In other embodiments, coating material 15 is sufficiently chemically similar to the base material 12 that the two are strongly bonded together, e.g., so that the coating material 15 essentially becomes an extension of the underlying base material 12 and/or so that the coating material 15 and base material 12 form an integrated structure.

Figure 6:
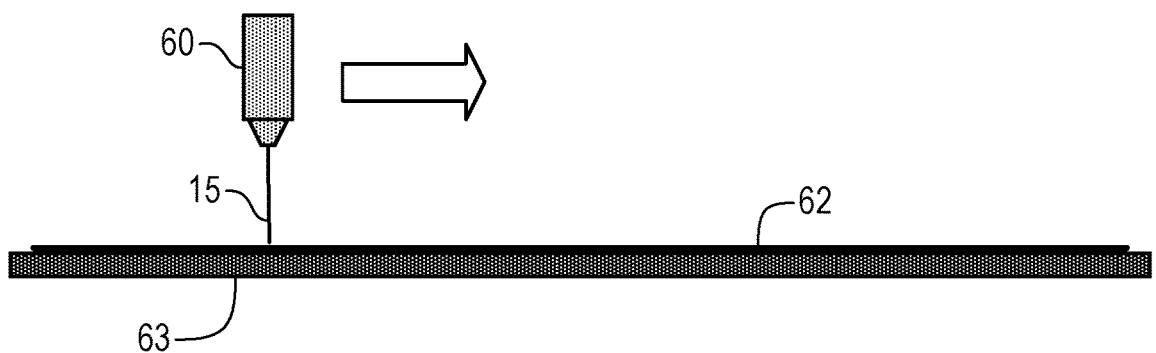
FIG. 6 is a vertical sectional view showing the application of a coating material, initially in liquid form, onto a sheet material substrate.
Figure 7:
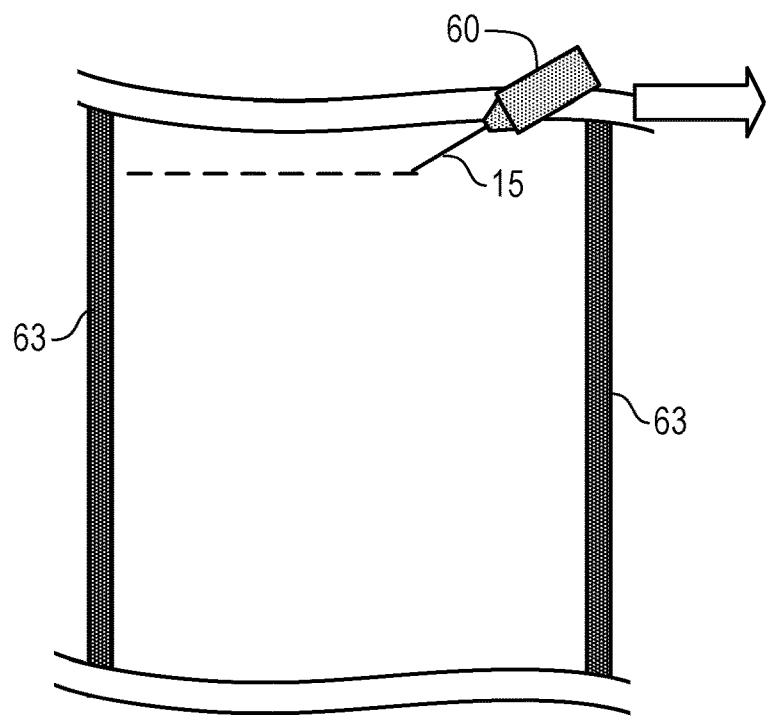
FIG. 7 is a top plan view showing the application of a coating material, initially in liquid form, onto a continuously fed sheet material substrate.

In one implementation of the present approach, which is illustrated in FIGS. 6 and 7, a reservoir or container (not shown) holding the coating material 15 is coupled (e.g., through a flexible tubing, not shown) to a nozzle 60. By using a very small nozzle opening and, e.g., selectively controlling a valve (e.g., in the nozzle 60), the coating material 15 can be deposited onto the substrate 62 in a precise manner, similar or even identical to the way in which inkjet printing conventionally is performed. Moreover, the coating material 15 can be applied in a continuous manner, e.g., by moving the substrate 62, while still in sheet form, on a conveyor belt 63 (e.g., digitally controlled to move in small incremental steps) and moving the nozzle 60 back and forth in a direction transverse to the direction in which the substrate 62 is moving.

Figure 8:
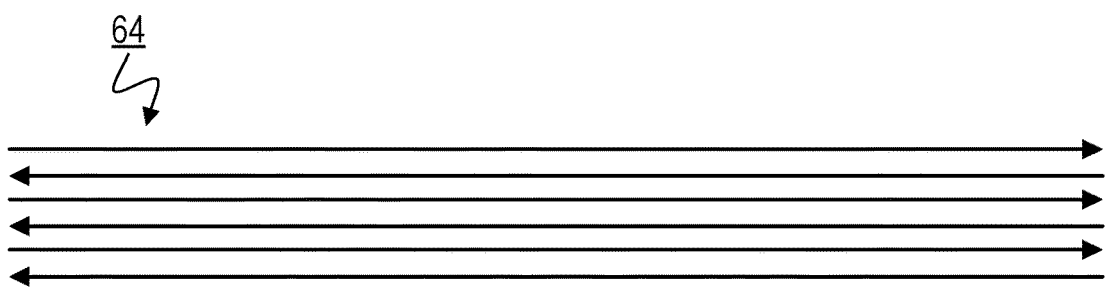
FIG. 8 illustrates a raster scan pattern for applying a coating material.

As a result, nozzle 60 essentially is moved in a raster pattern (such as raster pattern 64 shown in FIG. 8), relative to the substrate 62. By selectively controlling the deposition, any two-dimensional pattern can be deposited onto the substrate 62 in this manner. However, in alternate embodiments nozzle 60 can be moved in any other desired pattern relative to the substrate 62 (i.e., with the nozzle 60 and/or the substrate 62 actually being moved), e.g., in some cases more efficiently by eliminating movement across areas where no coating material 15 is to be deposited.

Figure 9A:
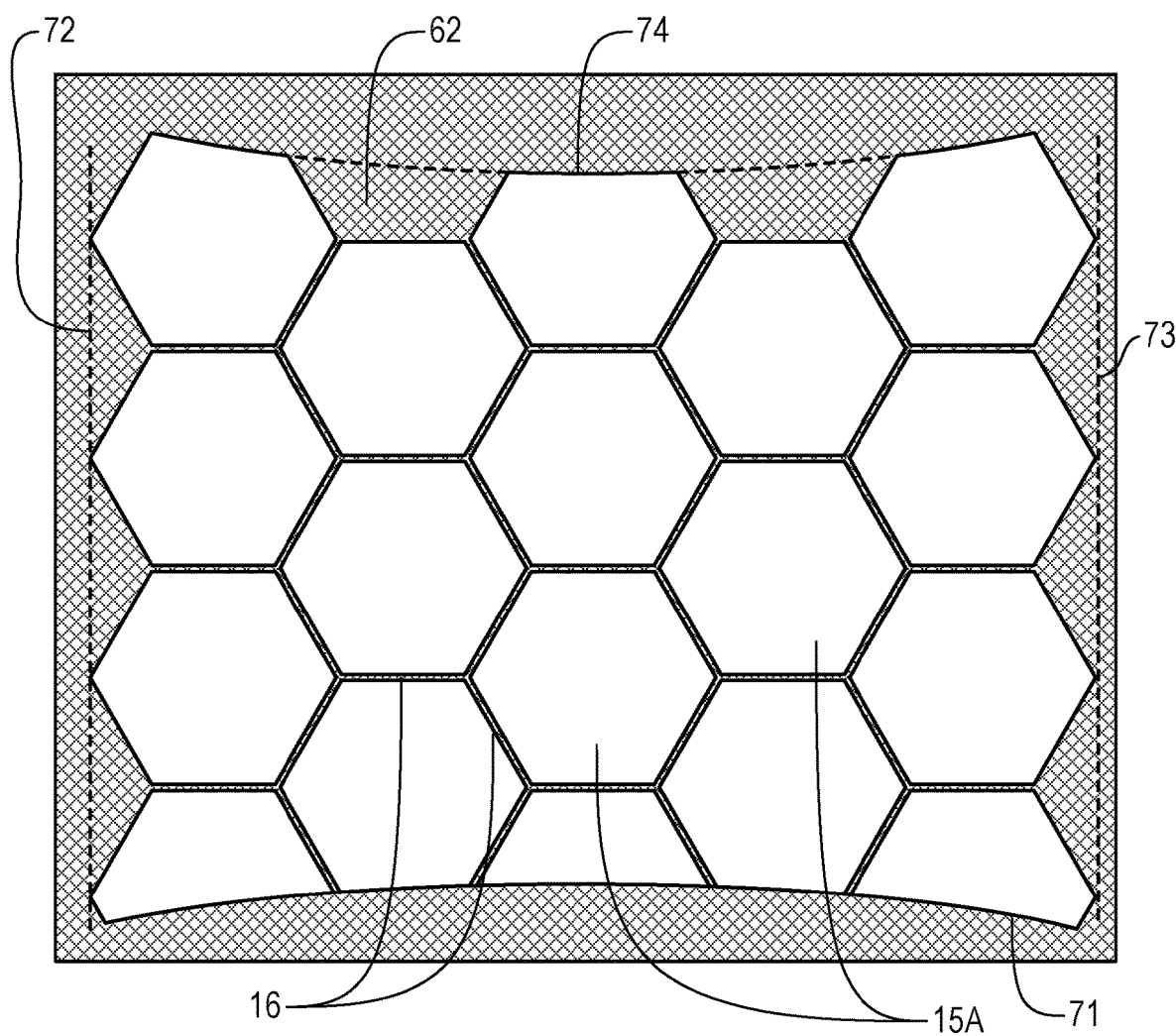
FIGS. 9A&B illustrate exemplary patterns of applied coating material that can be formed using techniques of the present invention.

An exemplary pattern that can be created in accordance with the foregoing technique is illustrated in FIG. 9A. In this example, the substrate 62 is a fabric material that is still in sheet form, prior to being cut or assembled. The overall pattern of the coating material 15 includes a number of hexagons 15A, with small gaps 16 between adjacent hexagons 15A where the underlying fabric substrate 62 is visible. Preferably, such gaps 16 have widths within the ranges noted above.

In addition, the overall pattern of the hexagons 15A has predetermined borders 71-74. Preferably, these borders 71-74 have been designed such that the patterned portion within corresponds to the portion of the shoe for which that section is going to be used in the final construction. As a result, it is only necessary to cut out the overall pattern along predetermined cut lines (not shown), preferably constituting a border around the overall pattern that leaves a margin of uncoated fabric substrate 62 (e.g., having a fixed width) so that the corresponding piece can be stitched together with other pieces to form the corresponding portion of the shoe (e.g., the shoe's upper 10). It is noted that such outlines, e.g., can be imprinted onto the substrate 62 (for manual cutting) or can be predetermined virtual lines (for computer-controlled or other automated machine cutting). In any event, the specific cut lines typically will vary depending upon the size of the shoe that is to be made.

It is also noted that the borders 71-74 of the overall pattern can have any of a variety of different characteristics, e.g., depending upon the visual effect desired to be achieved. For example, bottom border 71 is perfectly smooth, with the hexagons 15A simply having been terminated along such border 71. Side borders 72 and 73 are formed more roughly, generally following a desired contour or line, but with the constraint that only whole (not partial) hexagons 15A are used. Top border 74 uses a combination of these approaches, e.g., so that small pieces of hexagons 15A are cut off where more than a certain proportion (such as one half) would still remain, but when greater than the specified proportion of a single exit on 15A falls outside of the desired border, the entire small hexagon 15A instead is simply omitted.

Figure 9B:
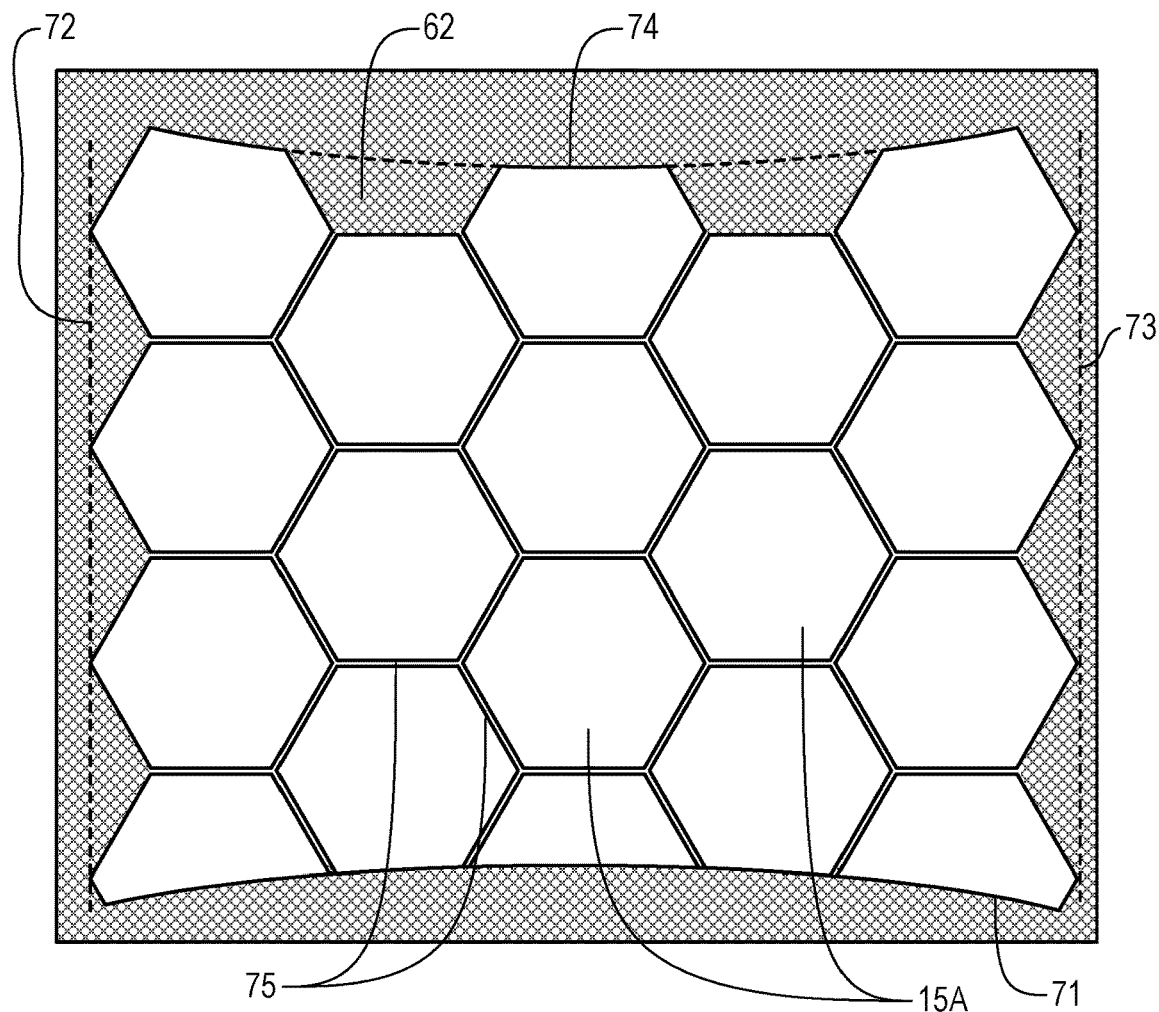

In an alternate embodiment, shown in FIG. 9B, gaps 16 are replaced with pattern lines 75 of coating material 15 that are significantly thinner than (e.g., less than 30-70% as thick as) the coating material 15 applied to create hexagons 15A. In a still further embodiment (not shown), the coating material 15 in the desired region (bounded by borders 71-74) is of uniform (or approximately uniform) thickness, and the individual hexagons 15A are separated by just decorative lines. In even further embodiments, the boundaries between individual hexagons 15A are thicker than the hexagons 15A themselves. As noted above, any other small design elements (such as those mentioned above) may be used in place of hexagons 15A.

The techniques for applying surface coatings according to the preferred approaches of the present invention flexibly permit any desired pattern to be applied and enable the flexible use of any number of different patterns, as often as desired, typically with minimal or no cost associated with changing patterns, once the desired designs have been initially created.

Figure 10:
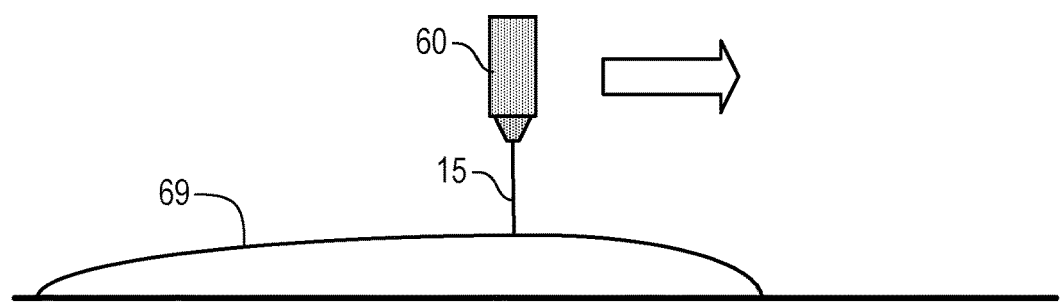
FIG. 10 is a rear plan view showing the application of a coating material, initially in liquid form, onto a substrate after multiple passes.

After a layer of the coating material 15 has had time to cure sufficiently, nozzle 60 can deposit another layer on top of it, typically after slightly increasing the vertical separation between substrate 62 and nozzle 60, e.g., by incrementally raising the nozzle 60 (or otherwise moving it slightly further away from the substrate 62) or lowering the platform 63 (e.g., a conveyor belt) that supports the substrate 62. Generally speaking, the next layer can be deposited at any given (x,y) position once the existing coating material 15 at that position has sufficiently cured. In many cases, where the coating material 15 cures quickly, this means that the deposition pattern can be repeated as soon as the last iteration has been completed. By repeating this process an appropriate number of times, almost any desired three-dimensional structure can be built up on top of the substrate 62, e.g., such as structure 69 illustrated in FIG. 10. Alternatively, just a single layer can be applied, e.g., in order to obtain a thin layer of coating material 15 in a desired pattern. Such a single-layer approach often will be desirable, e.g., where the coating material 15 is relatively expensive compared to the underlying substrate 62.

For the creation of multi-layered structures, rather than using a single nozzle 60 to perform multiple passes (for depositing multiple layers), a separate nozzle can be used to perform each pass (e.g., with adequate spatial separations to permit the previous layer to sufficiently cure before the next layer is applied). In this way, the desired structure can be continuously built upon the substrate 62 as the substrate 62 is moved along on a conveyor belt 63. For a more complicated structure, e.g., involving overhangs and/or loops, the structure can be built up around one or more removable inserts or other supporting structures.

To increase efficiency, nozzles having different sizes and/or different amounts of dispersion can be used. For example, a wide-dispersion nozzle 60 can be used to apply a uniformly thick layer of the coating material 15 across large areas, such as front portion 15B and/or rear portion 15C, particularly where those portions of the shoe are being coated while still in their uncut sheet form (which then subsequently can be cut into the desired pieces). Then, a narrower-dispersion nozzle 60 can be used for creating finer details. Also, multiple different nozzles 60 can be used if it is desired to create structures, thin coatings or other designs that incorporate multiple different colors and/or materials. Alternatively, a single nozzle can be used, particularly for monochrome single-material structures or designs.

In order to implement the present technique, e.g., a modified version of any of the existing techniques for 2-D printing (traditionally used on paper) or 3-D printing (traditionally used for rapid prototyping) or other additive manufacturing technologies may be used. One aspect of the present embodiments that is different from such existing techniques is that the liquid materials are deposited on a substrate that is part of a completed shoe or on a sheet material or other component that is used to fabricate a shoe. For this reason, the coating material 15 used for the purposes of the present invention preferably is selected so as to be well-suited for bonding to the specific material that has been used for the substrate. Another difference is that certain embodiments of the present invention employ just a very thin pattern of the coating material 15, often just a single layer, or no more than 2-4 layers. In any event, bonding various types of materials onto the shoe's upper 10 or sole 8 using the techniques of the present invention can be used to change the character of the respective component.

As indicated above, the processes of the present invention generally can be performed on a sheet of material (e.g., as shown in FIGS. 6-10) which is then cut into the desired shoe component (e.g., all or a portion of upper 10) and then assembled to form the entire shoe or some part thereof. Advantages of this approach are that the nozzle 60 only needs to be moved relative to the substrate 62 within a relatively limited range, that it often is relatively easy to create desired patterns because the substrate can be entirely flat, and that the substrate can be processed in a continuous manner (e.g., by feeding sheet material from a large roll). Then, fully or partially completed pieces can be cut from the sheet and used in manufacturing a variety of shoes 5 (e.g., by selecting the pieces having the desired designs).

Alternatively, or in addition, such techniques can be performed on a fully or partially completed shoe, e.g., with a last inserted in order to hold the various surfaces of the shoe in fixed, predetermined positions. Such an approach may be implemented, e.g., by mounting the nozzle 60 on a robotic arm.

Still further, the foregoing approaches can be combined. In one example, for most purposes, the coating material 15 is deposited into the desired patterns onto a sheet material that ultimately is used to form different portions of the shoe. Then, only for situations where the coating material 15 is intended to cover adjacent components, the coating material 15 is deposited only after such adjacent components have been assembled together. Thus, for example, with respect to shoe 20, the small hexagons 15A and the rear portion 15C are deposited onto the sheet material(s) that ultimately are assembled to form upper 10, while band 15D is deposited only after the upper 10 has been attached to the sole 8.

The foregoing discussion concerns application of a coating material 15 over relatively large areas, such as 15B-D, and/or over a number of smaller areas, such as hexagons 15A. In addition, it is possible to apply the coating material 15 to a number of very small areas (sometimes referred to herein as micro regions), such as areas having dimensions that are smaller than 1 mm, or even smaller than 100-300µ. Such micro regions may be applied in a predetermined manner to the underlying substrate 62, i.e., irrespective of any characteristics of the substrate 62. Alternatively, such micro regions may be placed in a manner so as to interact with one or more characteristics of the surface of the substrate 62.

Figure 11:
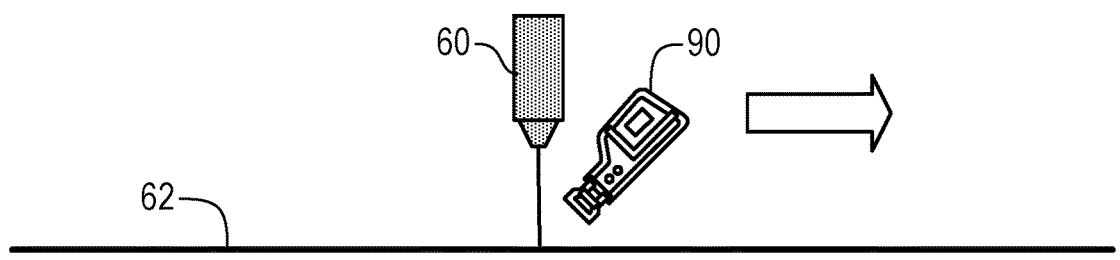
FIG. 11 is a rear plan view showing the application of a liquid coating material onto a substrate with the use of a sensor for precisely controlling such application based on surface characteristics of the substrate.

For these latter embodiments, it often will be desirable to use one or more cameras, such as camera 90, or other sensors to detect characteristics of the surface of substrate 62, in conjunction with nozzle 60, e.g., as shown in FIG. 11. For simplicity, the discussions herein generally refer to camera 90. However, it should be understood that each of such references could apply to any number of cameras and/or other kinds of sensors for detecting the desired characteristic of the surface of the substrate 62.

Figure 12:
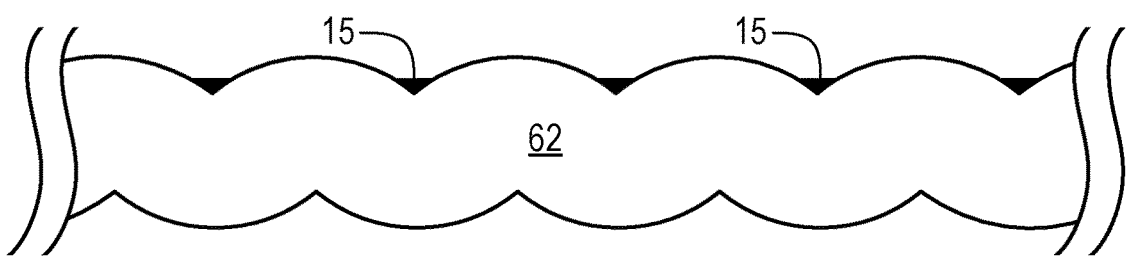
FIG. 12 is a partial sectional view showing liquid material deposited into indentations within the surface of a substrate after an initial pass, according to a representative embodiment of the present invention.
Figure 13:
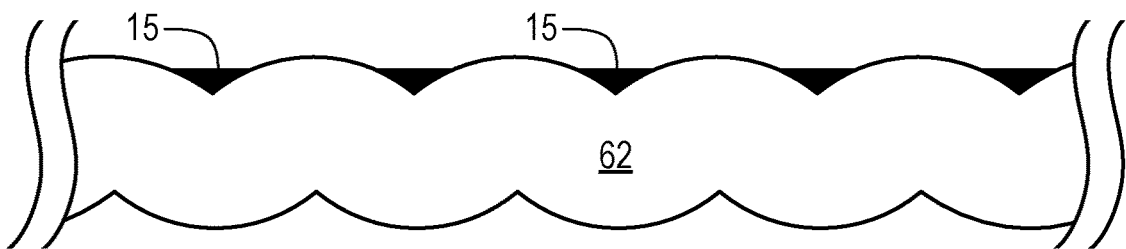
FIG. 13 is a partial sectional view showing liquid material deposited into indentations within the surface of a substrate after multiple passes.
Figure 14:
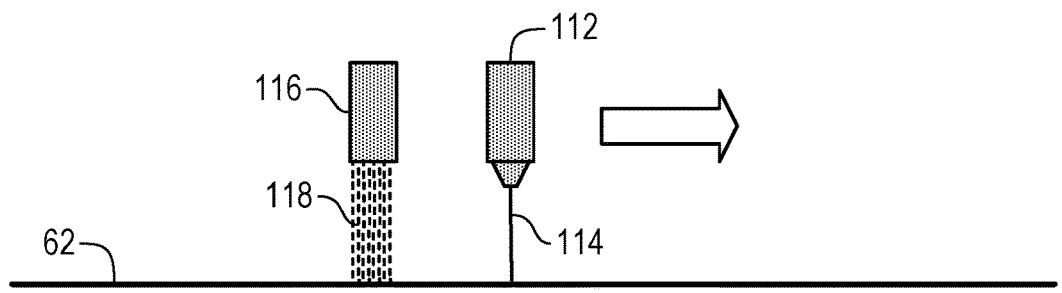
FIG. 14 is a vertical sectional view showing application of a particulate coating material onto a sheet material substrate using a separately applied liquid adhesive material according to a first representative embodiment.
Figure 15:
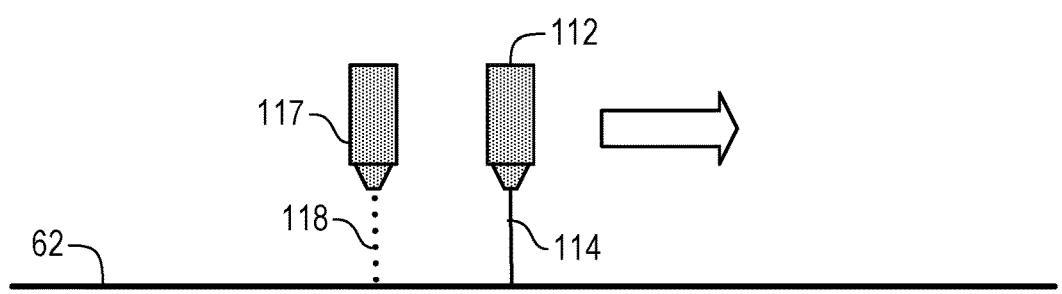
FIG. 15 is a vertical sectional view showing application of a particulate coating material onto a sheet material substrate using a separately applied liquid adhesive material according to a second representative embodiment.
Figure 16:
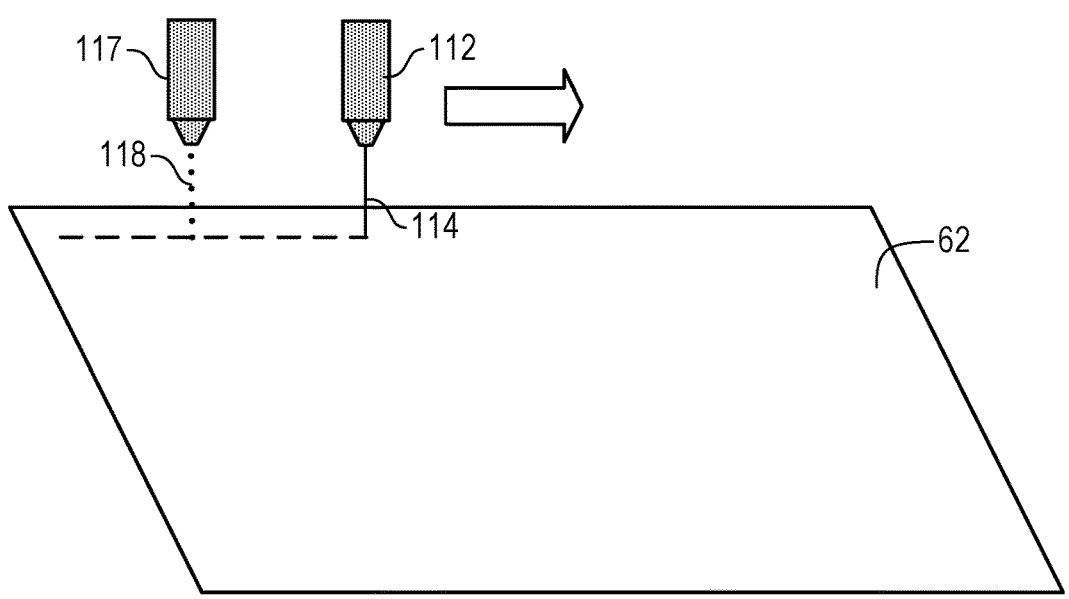
FIG. 16 is a perspective view showing application of a particulate coating material onto a sheet material substrate using a separately applied liquid adhesive material according to the second representative embodiment.

One specific example of how coating material 15 may be applied in this manner is illustrated in FIGS. 12 and 13. At a magnified or even a microscopic level, the substrate 62 has an uneven surface, with a number of indentations and protrusions (e.g., which in the case of a fabric material typically is the natural result of a weave pattern). In the present example, during a first pass of the nozzle 60, as shown in FIG. 12, the coating material 15 is deposited only (or primarily) into the indentations, thereby partially filling such indentations and, as a result, both smoothing out the surface and creating a composite surface area, in which there are alternating regions of the substrate material 62 and the coating material 15, at a very small or microscopic level. During a second pass, as shown in FIG. 13, additional amounts of the coating material 15 are deposited only (or primarily) into the indentations, thereby increasing both the thickness of the coating material 15 and the amount of its coverage area, relative to the exposed surface area of the substrate 62. Any number of passes may be performed to achieve any desired thickness of the coating material 15 and/or any desired proportion of surface area (such as more than 50% or 90% of the surface area consisting of coating material 15, i.e., less than 50% or 10%, respectively, consisting of the material of substrate 62). Alternatively, a larger amount of the coating material 15 may be applied in a single pass to achieve the same results.

When used, such differential application of coating material 15 covers a fairly large area of the substrate 62, such as an aggregate area of at least 20-50 square centimeters ($cm^2$), where at least 75% of the coating material applied to such area is disposed in the indentations, leaving at least the higher portions of the protrusions largely exposed. As noted above, coating material 15 according to the present invention can be applied to the upper 10 and/or to the sole 8 (particularly the outsole and, more particularly, the bottom surface of the outsole), and all of the same considerations pertain to both kinds of application.

Particle Bonding.

In the preceding embodiments, the coating material 15 is applied to the substrate 62 in a liquid or semi-liquid state. In the current embodiments, the coating material 15 is applied, at least in part, in a solid, particulate form. One such embodiment is illustrated in FIGS. 14-17. In this embodiment, at least two nozzles are employed to deposit the coating material 15—a nozzle 112 for applying an adhesive material 114, preferably in liquid form, and a nozzle 116 or 117 for applying the particulate coating material 118, with the adhesive material 114 being used to bond the individual particles 118 together and to the substrate 62, and with the particulate material 118 alone or in the particulate material 118 in combination with the adhesive material 114 being considered the coating material 15. Because the particles 118 are simply being bonded, a wide variety of types of material may be used for particles 118.

Figure 17:
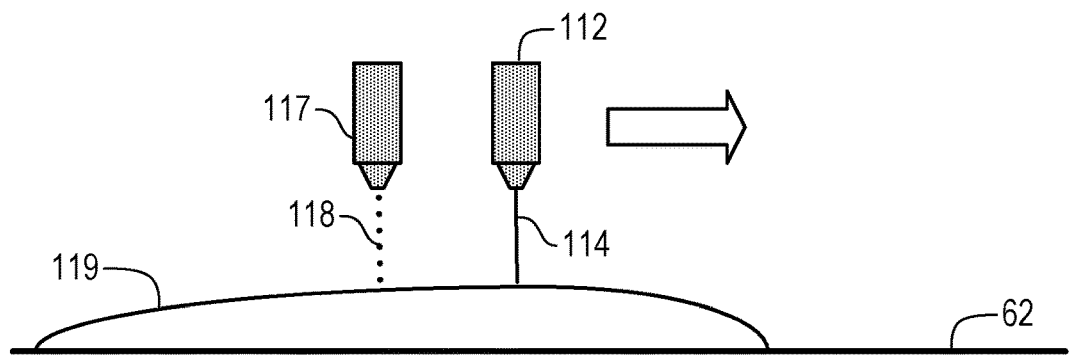
FIG. 17 is a rear plan view showing the application of a particulate coating material onto a sheet material substrate using a separately applied liquid adhesive material, after multiple passes.

In the preferred embodiments, coating material 118 is made up of small (e.g., powder-sized) particles (e.g., less than 1-200μ), with the specific size typically depending upon the desired resolution (smoothness/graininess) of the design that is being created and the desired speed of creating it. In certain embodiments, the average particle size is between 20 and 200μ across. After applying a very thin layer of the adhesive material 114, the particulate coating material 118 is deposited on top of adhesive material 114. The layer of adhesive material 114 preferably defines the shape of the structure that is being created at that particular layer. When nozzle 116 is used, the particulate coating material 118 is deposited more coarsely than the application of the adhesive material 114, and any particulate coating material 118 that does not adhere to the adhesive material 114 can be simply blown or vacuumed off the substrate 62. Nozzle 117, on the other hand, applies the particulate coating material 118 more precisely so as to match the pattern in which the adhesive material 114 has been deposited, meaning that little or no such blowing or vacuuming need be used. As with the technique described in the preceding section, and as illustrated in FIG. 17, any number of layers can be deposited in this manner, with each layer having any defined shape, so that arbitrary three-dimensional structures (such as structure 119) can be built up on top of substrate 62.

Figure 18:
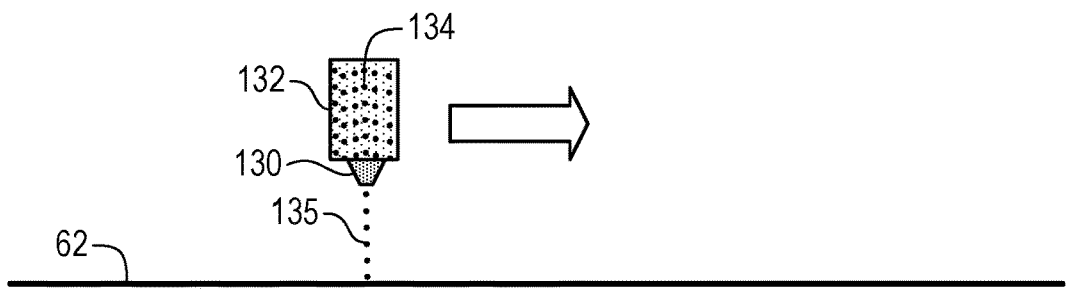
FIG. 18 is a rear plan view showing the application of a mixture of adhesive material and particulate material onto a sheet material substrate.

In an alternate embodiment, shown in FIG. 18, rather than using two separate nozzles, a single nozzle 130 is attached to a chamber 132 in which a mixture 134 the particulate coating material 118 and the adhesive material 114 (in the form of a very fine mist or in a vaporized form) are continuously circulated and mixed together so that the particles 118 are coated with the adhesive material 114. Such mixing preferably is performed within an environment in which the adhesive material 114 is prevented from (or at least delayed in) curing (e.g., by preventing it from being exposed to oxygen, heat and/or light). Alternatively, the mixing can be accomplished shortly before the coating material 118 is sprayed or otherwise deposited. In either event, the adhesive-coated particles 135 emerge from nozzle 130 and stick to the substrate 62 on contact. As a result, just a single nozzle 130 can be used to provide essentially the same results described above. Of course, it is also possible to use multiple nozzles, e.g., in order to more quickly apply a desired design, to create a structure that employs multiple different colors and/or multiple different types of materials, and/or to provide variations in the thickness of the coating material 15 for the purpose of achieving different levels of flexibility in different regions.

Figure 19:
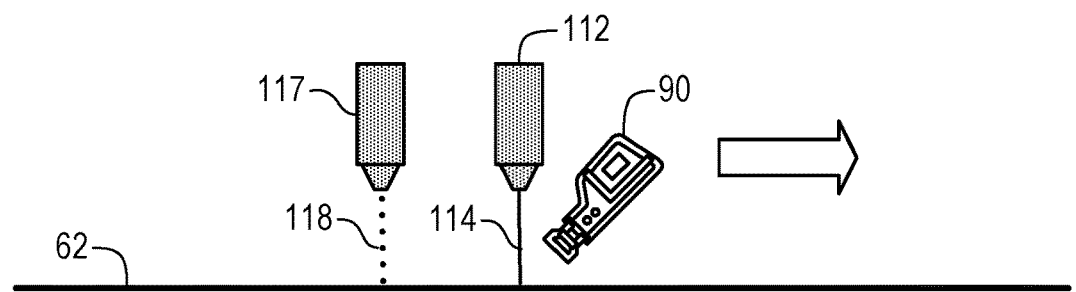
FIG. 19 is a rear plan view showing the application of a liquid adhesive material and a separate particulate material onto a substrate with the use of a sensor for precisely controlling such application based on surface characteristics of the substrate.
Figure 20:
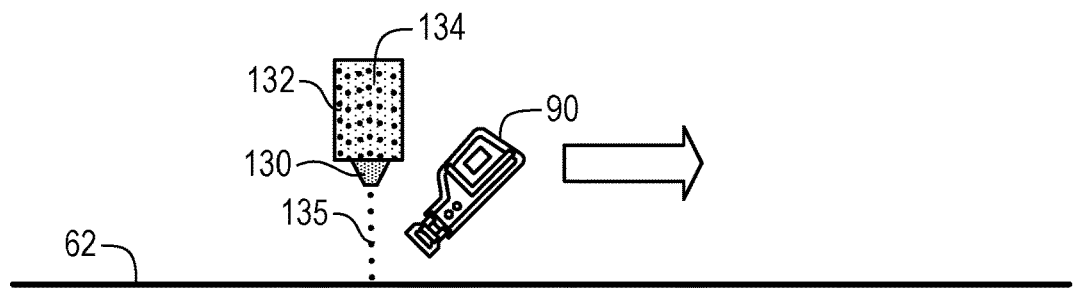
FIG. 20 is a rear plan view showing the application of a mixture of adhesive material and particulate material onto a substrate with the use of a sensor for precisely controlling such application based on surface characteristics of the substrate.
Figure 21A:
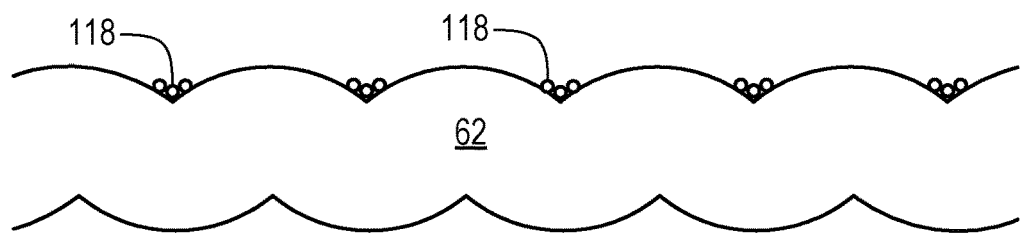
FIG. 21A is a partial sectional view showing particulate material deposited into indentations within the surface of a substrate after an initial pass.
Figure 21B:
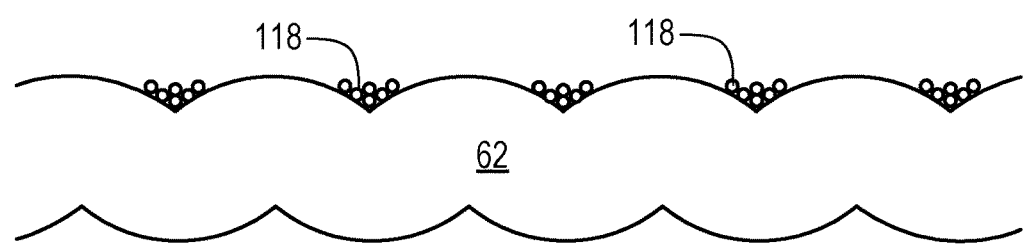
FIGS. 21B-D illustrate the appearance after the second, third and fourth passes, respectively.
Figure 21C:
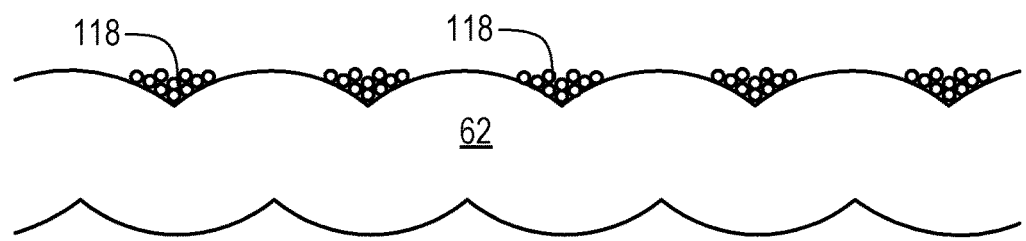
Figure 21D:
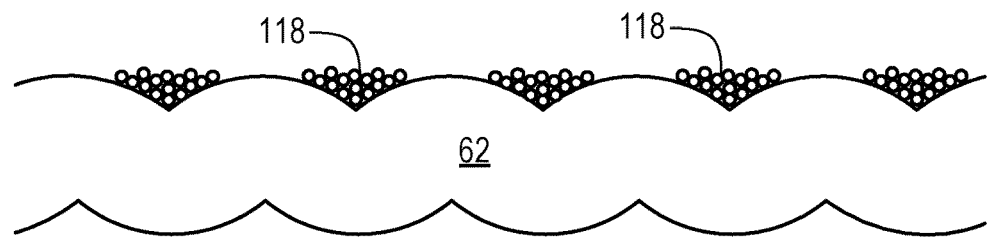

As in the preceding embodiments, the present techniques can be used in conjunction with a camera or other sensor 90 for applying the particles 118 in a manner that is specific to the surface of the substrate 62. Examples are illustrated in FIG. 19 (in which information collected from camera 90 is used to control the application of adhesive material 114 by nozzle 112 and potentially also the application of particles 118 by nozzle 117) and 20 (in which information collected from camera 90 is used to control the application of the pre-coated particles 135 by nozzle 130).

FIGS. 21A-D illustrate the progressive application of the particles 118 (or 135) in four layers, corresponding to four passes by any of the nozzles 116, 117 or 130 (e.g., moving relative to the substrate 62 in the raster pattern 64), respectively. As in the previous techniques, the layering can be halted at any point (e.g., after any of number of layers) or continued for any desired number of layers, e.g., in order to achieve any desired proportion of surface area occupied by the particulate material 118 (as opposed to surface area occupied by the material of substrate 62), e.g., taking into account the compressibility of the different types of materials (in situations where compressibility is a relevant consideration, such as where the substrate 62 is intended to constitute the outsole of the shoe 5). In the preferred embodiments, the coating material 15 (e.g., particulate material 118 or a combination of particulate material 118 and adhesive material 114) occupies at least 90% of the surface area when used on the shoe's upper and occupies at least 50% of the surface area when used on the shoe's bottom surface (e.g. outsole).

Also, it should be noted that the camera or other sensor 90 also (or instead) can be used to deposit any of the coating materials 15 discussed herein in any other manner relative to any other characteristic of the surface of the substrate 62, e.g., to interact in a desired manner with a printed-on pattern. In addition, in any embodiment that uses particles for the coating material 15, different sized particles can be deposited in different layers, e.g., using larger particles for coarser coverage and smaller particles to create finer details.

Particle Deposition with Multiple State Changes.

Figure 22:
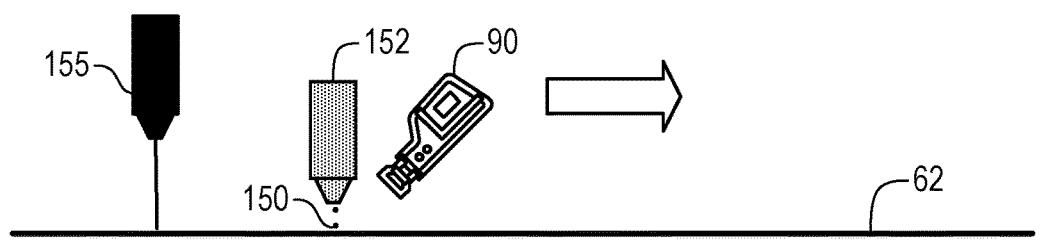
FIG. 22 is a rear plan view showing the application of a particulate material onto a substrate with the use of a sensor for precisely controlling such application based on surface characteristics of the substrate, followed by a laser for at least partially liquefying such particulate material.

In the present set of embodiments, the coating material 15 is deposited onto the substrate 62 in the form of small (e.g., powder-sized and/or spherical) particles which are then at least partially liquefied and then caused (or allowed) to re-solidify, thereby causing them to fuse together. One such embodiment is illustrated in FIG. 22. Here, particles 150 are deposited onto the substrate 62 via a nozzle (or other type of applicator) 152. In this specific embodiment, such deposition is performed using feedback from camera (or other type of sensor) 90, which senses at least one aspect of the surface of substrate 62. However, in alternate embodiments camera or sensor 90 is omitted. In any event, after deposition, the particles 150 are at least partially liquefied, preferably through the use of heat and/or light, such as by using laser 155. More preferably, particles 150 in the initial layer are completely liquefied or are only liquefied along their bottom surfaces (e.g., by heating substrate 62) so as to ensure that such initial layer adequately bonds to the substrate 62, while particles 150 in subsequent layers are only liquefied (if at all) along their top surfaces to ensure that the next layer (if any) is able to adequately adhere to the current layer. In this way, a sequence of different layers can be formed, similar to the embodiments described above, thereby creating any desired three-dimensional structure. It is noted that after application of any particular layer, the non-bonded particles can be removed by using a blower or vacuum (not shown). As a result, the laser 155 can provide the desired precision, making it less important for applicator 152 to be precise.

Figure 23:
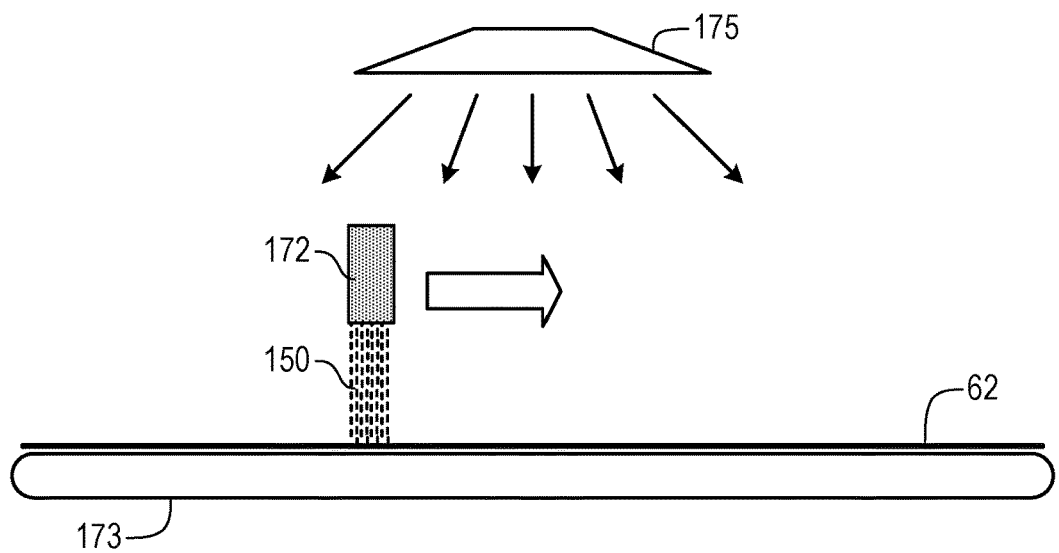
FIG. 23 is a rear plan view showing the application of a particulate material onto a substrate and an overhead heat and/or light source for at least partially liquefying such particulate material.

An alternate embodiment is illustrated in FIG. 23. Here, a particulate material 150 is deposited by applicator 172 (e.g., a nozzle or a shaker/container with a plurality of small openings) in a relatively coarse manner to the surface of substrate 62, and a vibrating platform 173 causes such particles 150 to settle into the indentations within that surface. It is noted that the use of vibrating platform 173, although not strictly necessary, can be desirable as a way of causing the particles 150 to settle into the substrate 62 surface's indentations without the need for a sensor 90 or other means for highly precise deposition in the first instance. An overhead lamp (or other source of heat and/or light) 175 is then used to at least partially liquefied such particles 150, e.g., in a manner similar to that described in the preceding paragraph. Also similar to the preceding embodiments, multiple layers of the particulate material 150 can be applied by repeating the same basic steps, i.e., deposition, partial or entire liquefication, and then re-solidification (typically after the next layer has been deposited).

Figure 24A:
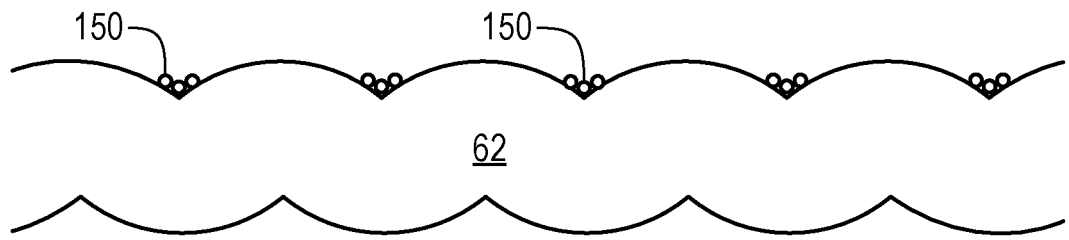
FIG. 24A is a partial sectional view showing particulate material deposited into indentations within the surface of a substrate after an initial pass.
Figure 24B:
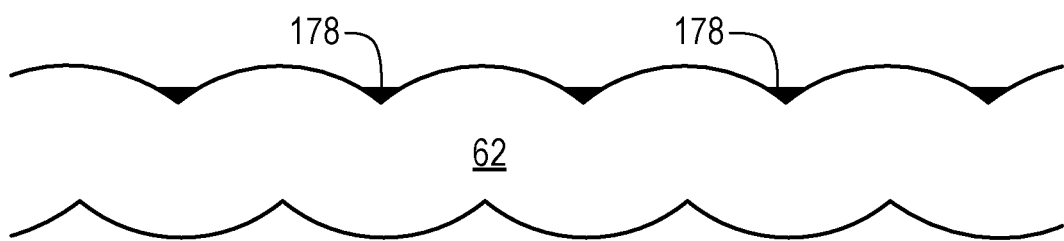
FIG. 24B illustrates the appearance of such material after it has been liquefied and then re-solidified.
Figure 25A:
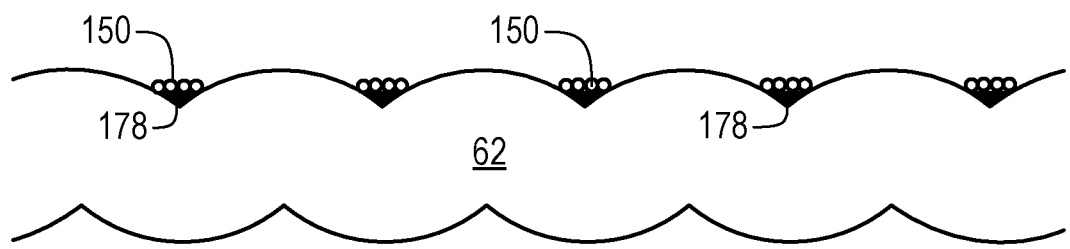
FIG. 25A is a partial sectional view showing particulate material deposited into indentations within the surface of a substrate after a second pass.
Figure 25B:
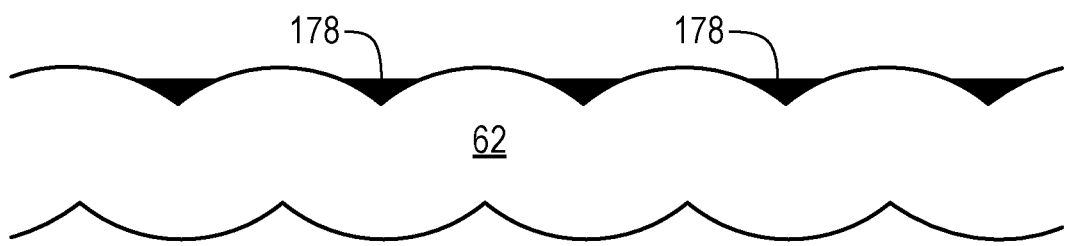
FIG. 25B illustrates the appearance of such material after it has been liquefied and then re-solidified.
Figure 26:
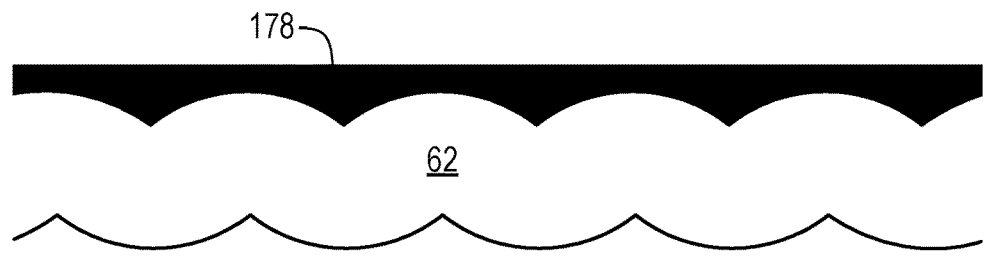
FIG. 26 is a partial sectional view showing coating material completely covering the surface of a substrate, e.g., after application of multiple layers.

One example of applying particles 150 according to either of the preceding embodiments is illustrated in FIGS. 24A&B and 25A&B. As shown in FIG. 24A, an initial layer of the particles 150 is deposited into the indentations within the surface of the substrate 62 (e.g., either directly or after having been vibrated into this position). Next, as shown in FIG. 24B, that layer is at least partially liquefied (e.g., using laser 155 or overhead lamp 175), so that at least partially liquefied material 178 is disposed within the indentations of the substrate 62. Thereafter, preferably while that initial layer remains at least partially liquefied, a subsequent layer of particles 150 is deposited into the indentations, on top of the initial layer, as illustrated in FIG. 25A. Then, the second layer is at least partially liquefied, as illustrated in FIG. 25B. This process can be repeated for any desired number of layers, e.g., to achieve any desired proportional surface coverage of the material 150 in relation to the surface area occupied by the material of substrate 62. It is noted that just a very thin layer of the material 150 can be used to achieve any desired percentage of coverage, even greater than 90% (which is preferred for the upper 10, while greater than 50% often is preferred for the outsole). Repeating this process a sufficient number of times (or even with a single layer that is sufficiently thick) can even result in 100% coverage, e.g., as illustrated in FIG. 26. Of course, similar final results also can be achieved using the liquid deposition technique discussed above.

Alternate Deposition Techniques.

In the preceding embodiments, the coating material 15 (including a separate adhesive material in certain cases) is applied using one or more nozzles. While this approach often is desirable, e.g., where a narrow deposition pattern is used and highly accurate control is desired, other approaches also can be used and can be even more desirable in the right circumstances.

Figure 27:
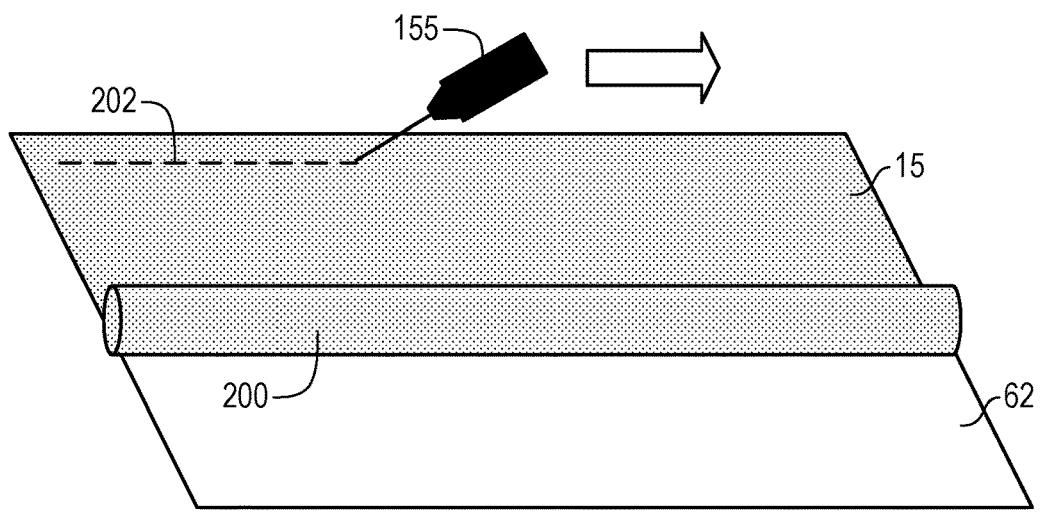
FIG. 27 is a perspective view showing substantially uniform application of a particulate material using a roller, followed by a laser to at least partially liquefy such material in a desired pattern.

For instance, in the embodiment shown in FIG. 27, a roller 200 is used to apply the coating material 15 to the substrate 62. In this embodiment, coating material 15 preferably is a particulate material 150, it preferably is applied substantially uniformly across the surface of substrate 62, and a laser 155 is used to liquefy only those portions corresponding to the pattern 202 that is desired to be created onto the surface. Such liquefication and subsequent curing preferably cause the material 150 within such pattern 202 to adhere to the surface of substrate 62. Then, the portions of material 150 that remain in particulate form (i.e., the material 150 outside of the pattern 202) can be simply vacuumed up or blown off (e.g., for reuse), e.g., using a conventional blower or vacuum apparatus (not shown).

Figure 28:
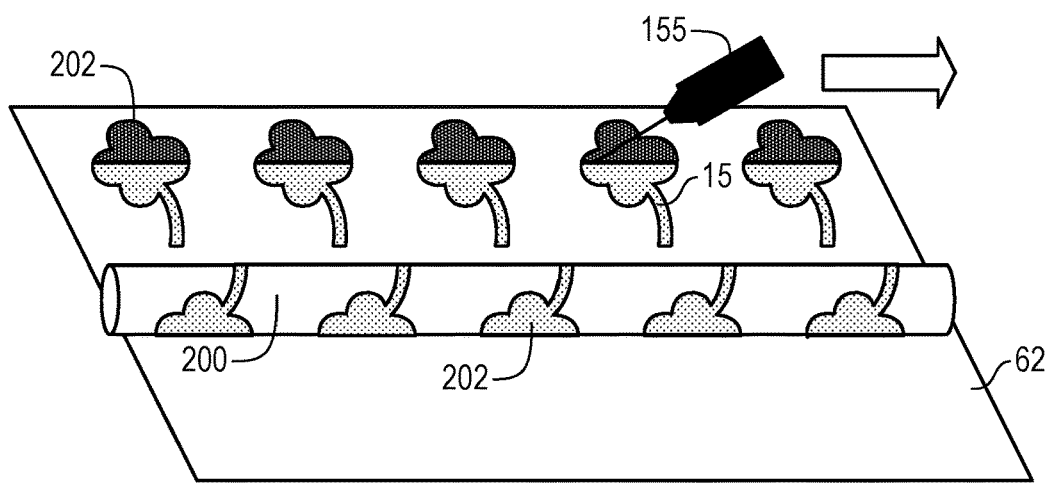
FIG. 28 is a perspective view showing application of a particulate material in a desired pattern using a roller, followed by a source of heat and/or light to at least partially liquefy such material.
Figure 29:
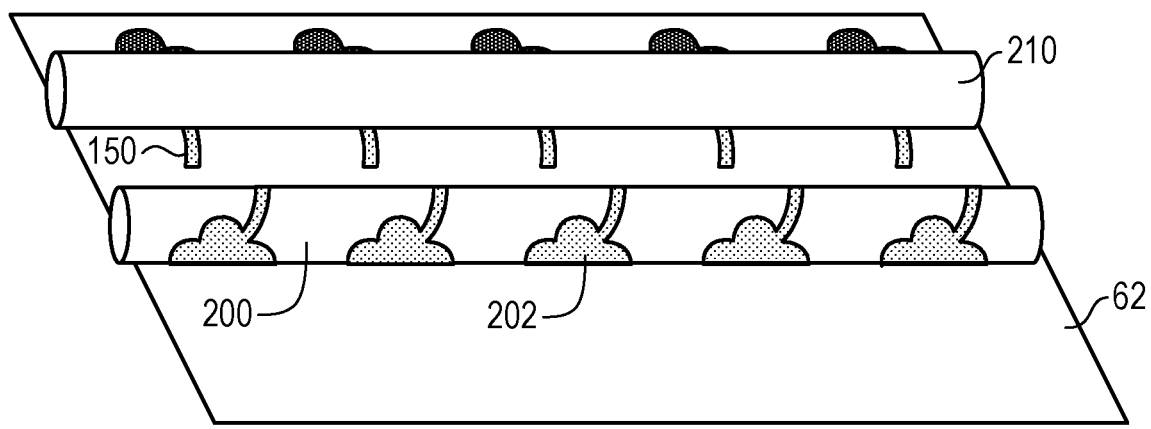
FIG. 29 is a perspective view showing application of a particulate material in a desired pattern using a roller, followed by a heated roller to at least partially liquefy such material.

In an alternate embodiment, shown in FIG. 28, the particulate material 150 (or other type of coating material 15) is applied to the roller 200 in the desired pattern 202 and then transferred to the surface of substrate 62 in this pattern 202. As a result, the liquefication can be performed using a laser 155 (as shown) or, typically more efficiently, using an overhead lamp 175, a heated platform or other means for covering a wide area. For example, as shown in FIG. 29, a heated roller 210 follows the roller 200 that lays down the pattern of coating material 15, causing the coating material 15 to be liquefied and thereby adhere to the surface of substrate 62.

In either of the foregoing embodiments (shown in FIGS. 28 and 29), particulate material 150 can be adhered to roller 200 and then transferred to the surface of substrate 62 by electrostatically charging roller 200, e.g., in a manner similar to the way in which conventional laser printing is performed. For embodiments in which the pattern 202 is to be applied to roller 200, preferably the roller 200 is uniformly electrostatically charged, and then the desired pattern is formed by using a second laser to eliminate the electrostatic charge outside of pattern 202, again similar to the way in which conventional laser printing is performed.

In still further embodiments, the roller 200 is coated with a coating material 15 in liquid form, and this liquid material is then transferred to the surface of substrate 62 (e.g., as illustrated in FIG. 27). In the preferred implementations of these embodiments, the coating material 15 cures upon exposure to light (e.g., using any conventional photopolymerization material) and is applied to the roller 200 and then transferred to substrate 62 in relative or complete darkness (or at least in safelight conditions). Then, a laser 155 can be used to cure the coating material 15 in the desired pattern 202, with the uncured material 15 simply being vacuumed away afterward. Alternatively, a similar coating material 15 that cures upon exposure to light (e.g., a photopolymerization material) is applied using a nozzle (e.g., by spraying on), and then a laser is used to cure such material 15 in the desired pattern. Still further, in any of the foregoing embodiments a coating material 15 that cures at elevated temperatures instead could be used, in which case laser 155 preferably is a heat-producing laser. Also, in any of the foregoing embodiments a coating material 15 that cures based on a reaction with a second material can be used, in which case the laser 155 preferably is replaced with a nozzle for depositing the second material in the desired pattern. It is noted that the foregoing techniques can be used to produce continuous sheets of patterned material or can be used on an entire shoe or any component thereof.

Mixed Particles.

Figure 30:
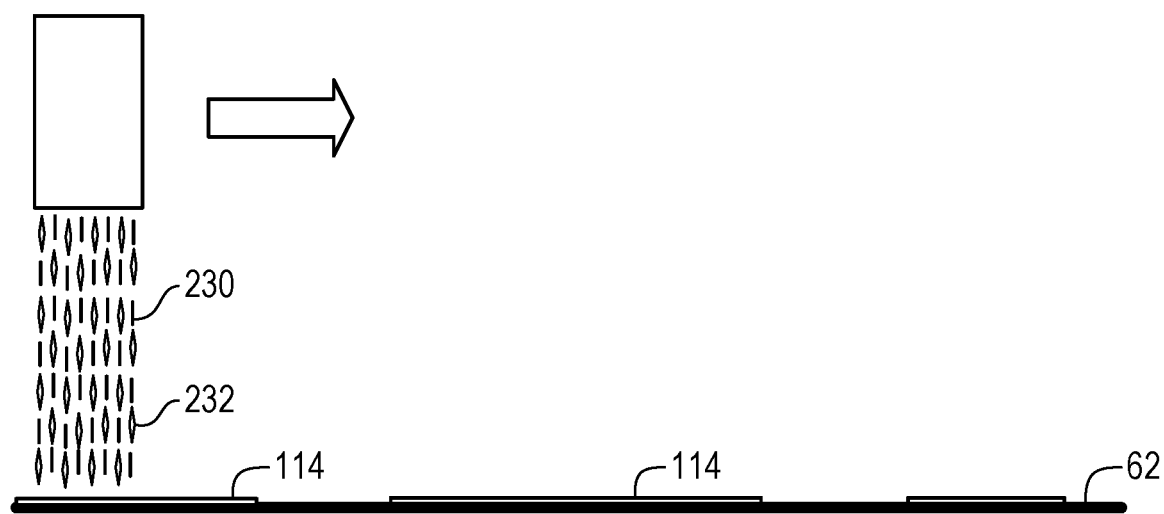
FIG. 30 is a vertical sectional view showing the application of a mixture of fibers and other small pieces being sprayed, flocked or otherwise deposited onto a substrate in a substantially uniform orientation.
Figure 31:
FIG. 31 is a vertical sectional view showing the application of a mixture of fibers and other small pieces being sprinkled or otherwise deposited onto a substrate in a non-uniform orientation.

In alternate embodiments of the invention, the coating material 15 comprises different types of particles that are attached to the substrate 62 via a separate adhesive material 114 that has been applied (e.g., using any of the techniques described above). An example is illustrated in FIG. 30. As shown, the adhesive material 114 has been deposited onto the surface of substrate 62 in a desired pattern. Then, a stream of different types of particles is projected (e.g., blown or flocked), preferably at a substantially right angle to the surface, so that such particles embed into the surface and cover it in the designated pattern. In the preferred embodiments, the particles include fibers 230 (e.g., natural fibers) and small plastic pieces 232 (e.g., having lengths and widths of 2-5 mm, with lengths that are at least approximately equal to the lengths of the fibers 230), but any other combination of different types of particles instead may be used, e.g., to achieve any desired effect. In one example, the fibers 230 are selected so as to be a desired color and the plastic particles 232 are translucent. Upon completion of this process, any of the particles that do not bond to the adhesive material 114 can be simply vacuumed up or blown off and recycled for subsequent use. Alternatively, rather than propelling the particles 230 and 232 into the adhesive material 114, they instead can be sprinkled on, so that they embedded into adhesive material 114 at a variety of different angles, e.g., as shown in FIG. 31. In the preferred embodiments, the particles 230 and 232 are very small (e.g., at the micron level), so that the resulting surface is smooth and feels solid, as opposed to just a surface coating.

In addition to providing a variety of different appearances, use of mixed particles in this manner can also in certain cases result in improved embedding by altering characteristics of the airflow. Also, in certain embodiments, prior to application of the particles, one of the particle types (e.g., the plastic pieces 232) is wetted, causing the other particle type to adhere to it, so the two types are carried together.

Combination Approaches and Structures.

A number of different processes (and resulting structures) have been described above. Each of such processes can be used alone, in combination with any of the others and/or in combination with other existing techniques for manufacturing shoes or shoe parts. For instance, in one such representative combination-approach embodiment, a layer of one type of coating material 15 (e.g., plastic) is first deposited and then a layer of another type of coating material 15 is deposited on top of that first layer. This second layer might comprise, for example, a mixture of particles (as described in the preceding section) or just a single type of particle (e.g., natural fibers or other natural particles, such as ground up: wood, paper, raw dried plant fibers, leather, or any other animal skin).

In addition, the second layer might be applied before the first layer has cured (or fully cured) so that it embeds directly within the first layer. Alternatively, the second layer might be applied using a separate adhesive material onto the first layer. Still further, the particles constituting the second layer might be sprinkled or otherwise simply deposited onto the first layer or instead might be flocked, sprayed or otherwise propelled into the first layer (or into an adhesive layer deposited on top of the first layer).

Custom-Ordering Techniques.

Figure 32:
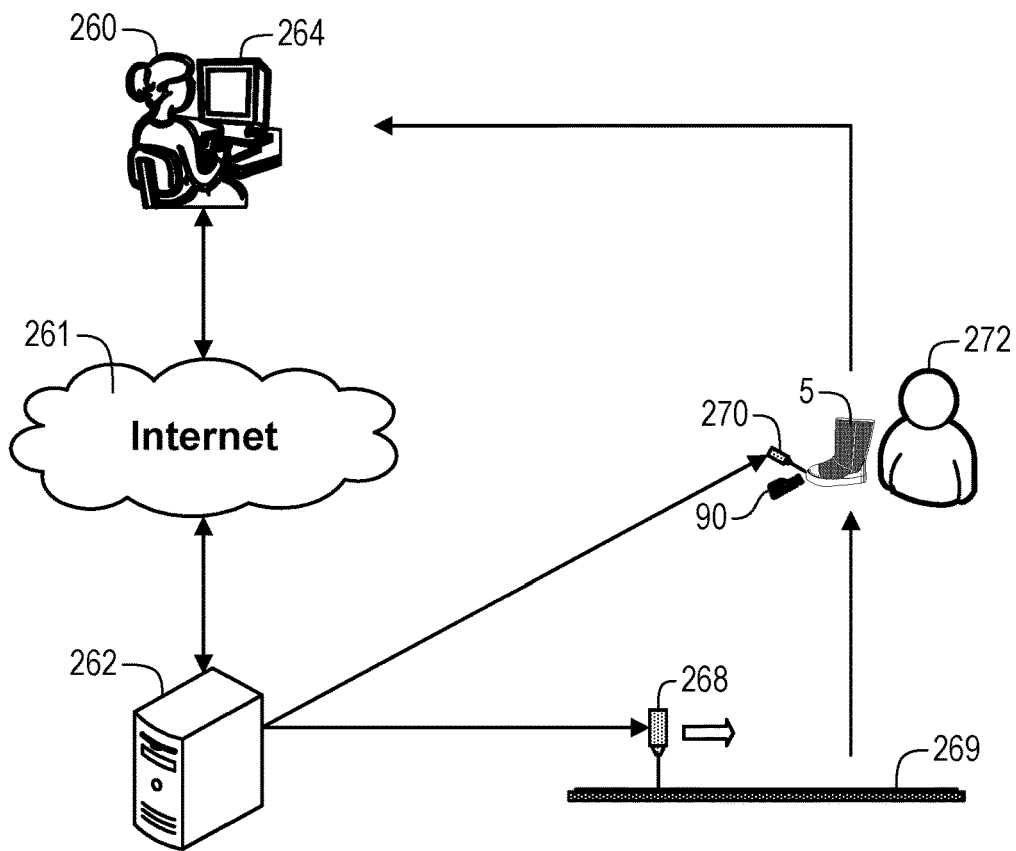
FIG. 32 is a block diagram illustrating an Internet-based system for allowing customers to custom-order shoes made in accordance with the techniques of the present invention.

As noted above, the techniques of the present invention generally are quite flexible in terms of the different types of patterns that can be applied. This flexibility is exploited in certain embodiments by allowing customers to essentially custom-design their own shoes. A system to facilitate such custom designs is illustrated in FIG. 32. A customer 260 communicates (e.g., via the Internet 261) with a server 262 for the shoe manufacturer, using her personal computer 264. For this purpose, server 262 preferably provides a set of user interfaces, preferably configured as Web pages or as pages generated by a proprietary application (or app) that has been downloaded into computer 264. More preferably, such user interfaces allow a customer 260 to select a shoe style and then customize the selected shoe 5 by specifying patterns and/or three-dimensional structures to be applied to specified portions of the shoe 5. Such patterns and structures may be selected from a set of predesignated elements, or may even be custom-designed by allowing the customer 260 to construct them through the user interfaces and/or to upload existing graphics and/or images (e.g., personal pictures).

In any event, a three-dimensional model of the selected shoe style preferably is presented to the customer 260, and the customer 260 is permitted to specify where the selected patterns and/or structures are to appear on the shoe 5. Upon making such selections, an as-built rendering preferably is displayed so that the customer 260 can approve the final design before submitting the order. Alternatively, modifications preferably can be made, reviewed and approved before submitting the order.

Once the order has been submitted, server 262 formats the information to provide application instruction data (e.g., in STL, VRML and/or WRL file formats) to controllers for one or more nozzles 268 (or other applicators) that apply patterns and structures to sheet material 269 and/or to one or more nozzles 270 (or other applicators) that apply patterns and structures to the completed shoe 5 (or to partially completed parts of it). For this portion of the process, it often will be desirable to use a camera or other sensor 90, e.g., to ensure that the design or structure is applied appropriately and/or to accommodate any variations in the surface to which the coating material 15 is being applied. As noted above, for efficiency reasons, to the extent it is practical to do so, as many of the patterns and structures as possible are applied while the materials are in sheet format 269. After the sheet material 269 has been prepared in this manner, it is cut and then a worker 272 assembles the pieces and prepares the shoe 5 for processing by the nozzle 270 (e.g., by installing it on a last). Finally, the completed shoe or shoes 5 are delivered to the customer 260 or to a store near the customer 260 (unless the customer information has been routed to a nearby store and such customization performed there for pickup by the customer 260).

Figure 33:
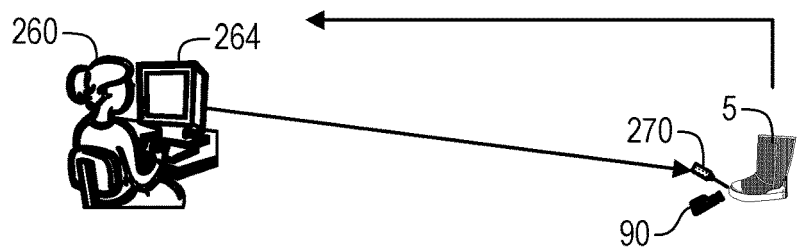
FIG. 33 is a block diagram illustrating an in-store system for allowing customers to custom-order shoes made in accordance with the techniques of the present invention.

A similar ordering and shoe-customization system also can be implemented entirely in-store, e.g., as illustrated in FIG. 33. In this embodiment, a computer terminal 264 is located within the store or other retail outlet, and the customer 260 enters any or all of the same information described above using the same or a similar user interface running on computer 264. Through a local communication link (e.g., local area network, WiFi network, LiFi network, or even a direct cable connection) the customization information is sent to a controller for nozzle 270 (e.g., which also relies on inputs from camera or other sensor 90). Once the desired shoe is placed on a last, the controller is activated and nozzle 270 automatically applies the designs and coatings specified by the customer 260, preferably in full sight of the customer 260. When both shoes 5 have been completed in the foregoing manner, they can be immediately given to the customer 260. Alternatively, e.g., if there is a significant backup, the customer 260 can be given a claim-check ticket or other identifier at the time of ordering to pick up the shoes 5 later.

Figure 34:
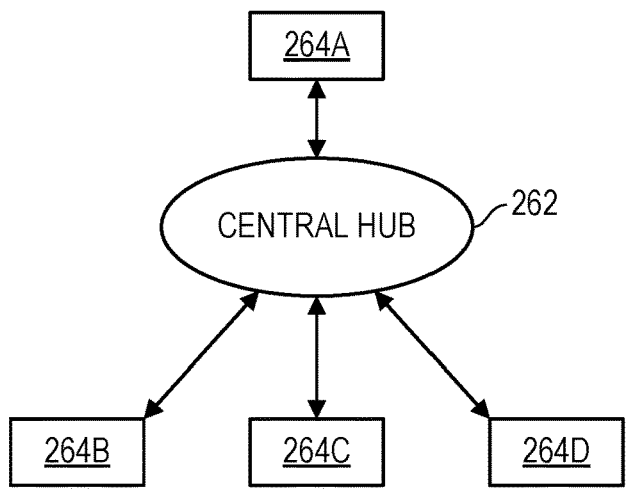
FIG. 34 is a block diagram illustrating a system for allowing customers to access and share custom designs for use in accordance with the techniques of the present invention.

Referring to FIG. 34, in the preferred embodiments of the invention, the central server 262 maintains a library of designs for use by the customers 260. Each such design could be specific to a particular shoe model or could be generic or applicable to multiple different shoe models (e.g., with the server 262 maintaining implementation details to adapt to specific different shoe models and/or relying on the feedback from camera or other sensor 90 to make appropriate adjustments for adapting the design to the surface differences of the different shoe models). Such a library can contain designs originated by the operator of server 262 and/or designs licensed from others. Thus, any of the computers 264A-D used for specifying shoe-customization information (e.g., personal computers of the customers 260 or in-store terminals) can retrieve (e.g., either in real time or by periodically downloading updates) and use any such custom designs.

In addition, the individual customers 260 preferably have the ability to modify such existing designs and/or create entirely new designs, e.g., through a website or other user interface downloaded from central server 262. As a result, customers 260 can be provided with a tremendous amount of flexibility to customize their own shoes 5.

Still further, in the preferred embodiments any individual customer 260 preferably has the ability to share his or her designs with other customers, e.g., by uploading them from his or her computer 264A to central server 262 and making them available within the library maintained by server 262 (either for free or for some monetary charge). In this way, any customer 260 can become a commercial designer and potentially even start a new fashion trend. Moreover, in certain embodiments such sharing is accommodated through a social network of the customers 260, e.g., where individual customers 260 can, if desired, have their own pages, blog, upload photographs showing how their designs have been applied, upload other content, post links to other content and/or provide links to download their designs.

The present invention also accommodates collaborative designs, e.g., in which the collaboration by any number of customers 260 can occur in real time or as a sequence of additions and/or modifications over time. Real-time collaboration preferably takes the form of a shared design window, simultaneously presented to two or more customers 260 through their respective user interfaces, where any one of the customers 260 can make additions, deletions or changes to the design while the other customers 260 observe such modifications as they are taking place. In some cases, control over who has the ability to make changes at any given moment resides with one of the customers 260 who has taken on the role of principal designer. In this way, creative energy can be synergistically enhanced among different people, potentially located anywhere in the world.

It is noted that the same design interface can be used irrespective of whether the design is to be made entirely by a single customer 260 or by a group of customers 260, with the only difference being whether the design interface is only being viewed by a single customer 260 or is being shared in real time (e.g., over the Internet or any other network). In the following example, it is generally assumed that a single customer 260 is creating the design. However, it should be understood that the same functionality, when shared, can allow any of a group of customers 260 to take control and make similar modifications.

Figure 35A:
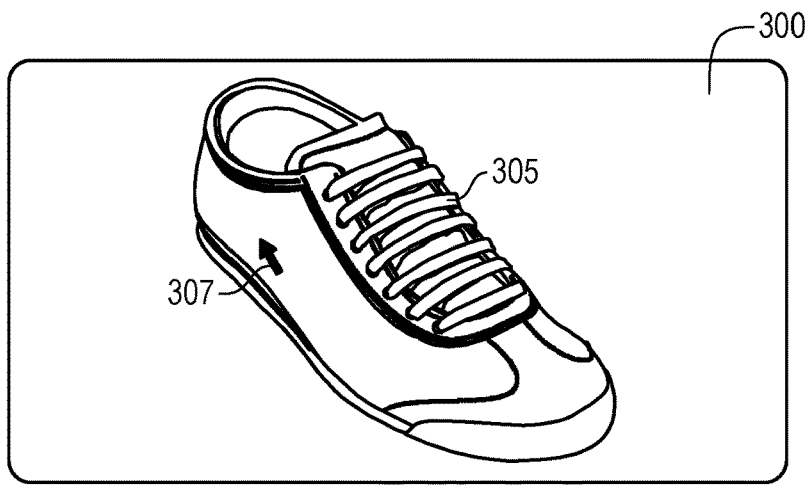
FIGS. 35A-D illustrate a user interface for customizing a shoe.

An exemplary design interface 300 is illustrated in FIGS. 35A-D. Initially, upon opening interface 300, the customer 260 chooses a shoe blank 305 (as shown in FIG. 35A) from a set of available blanks (not shown) corresponding to physical shoe blanks that are available for customization. Preferably, each such shoe blank is a fairly plain shoe (i.e., having little or no decorative elements), but instead just represents a particular style of shoe. However, in certain embodiments at least some of the shoe blanks include some (or even a significant amount of) decoration or other stylistic elements, e.g., in order to appeal to customers 260 who only are interested in doing light customization and/or in order to keep costs down when customization is significantly more expensive than mass production. Alternatively, some of the same benefits can be achieved by providing to the customer 260, through the user interface 300, a set of customization templates that include multiple stylistic elements that have been chosen to create an overall look and feel. In any event, a virtual representation of the selected shoe blank 305 is displayed on the design interface 300.

Thereafter, the customer 260 begins applying customizations, e.g., using a cursor 307 and a set of design tools such as those provided by conventional two-dimensional or three-dimensional drawing or design programs. Essentially, the customer 260 has the ability to build up on top of the shoe blank 305, preferably in any desired manner, using selected colors and/or selected coating materials 15. In certain embodiments, the coating material 15 is identical (or sufficiently molecularly similar) to the base material that the capabilities provided by the present system can be thought of as allowing the customer 260 to actually change the dimensions and/or design features of any desired portion of the shoe 305, and make such changes using any desired colors.

Figure 35B:
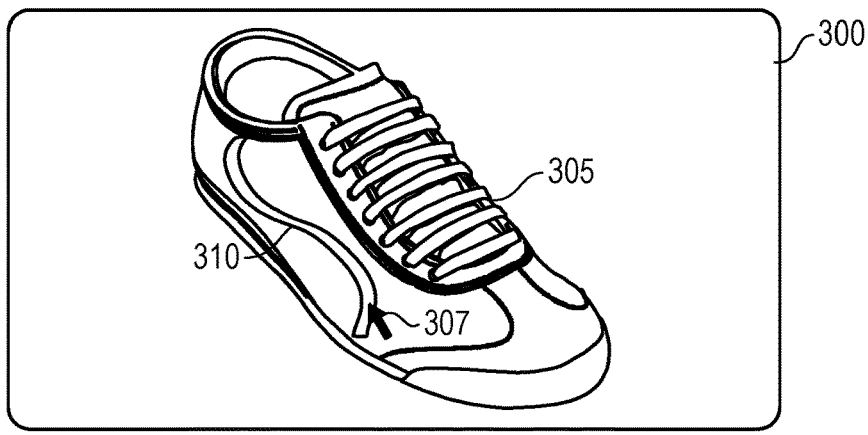

In the present example, as shown in FIG. 35B, the customer 260 first applies a pattern 310 to the side of the shoe 305, e.g., using freehand drawing and/or by choosing an existing design element from a set of side designs (e.g., that are specific to the selected blank 305 or that can be applied to different shoe blanks) and then making any desired modifications to such existing design element (e.g., changing the curvature of a particular border). In the preferred embodiments, the user interface 300 includes one or more smoothing filters (which can be applied manually and/or automatically) for smoothing out the lines and curves produced by any original freehand drawing or any freehand touchups to existing design elements.

Figure 35C:
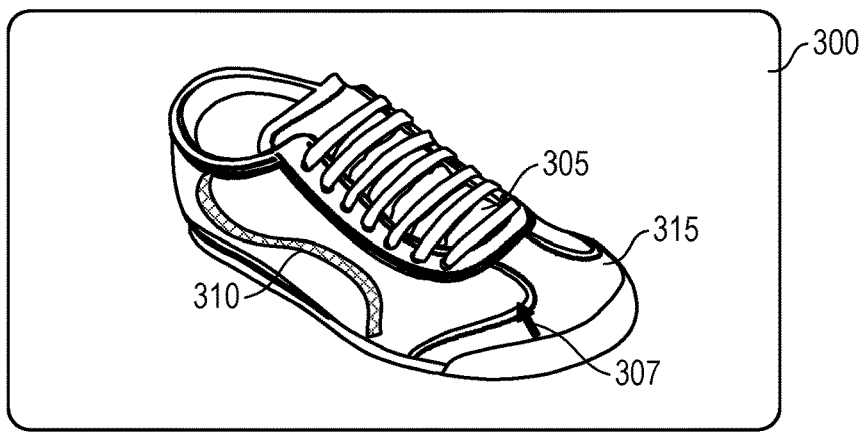
Figure 35D:
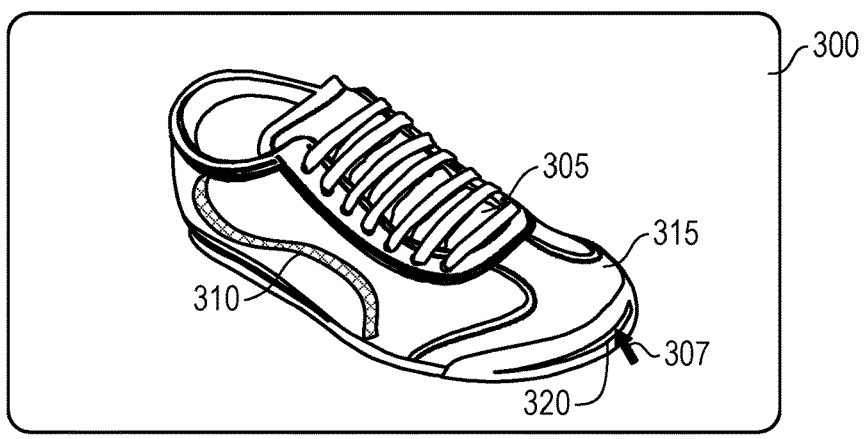

Next, as shown in FIG. 35C, the customer 260 applies a fill pattern and/or a desired three-dimensional contour to the side pattern 310 (e.g., from sets of available patterns and contours). Afterwards, the customer 260 rotates the shoe 305 in order to look at it from a different perspective and then begins drawing or otherwise applying a pattern 315 to the top front portion of the shoe 305. Finally, as shown in FIG. 35D, the customer 260 draws or otherwise applies a pattern 320 to the lower front portion of the shoe 305. In the preferred embodiments, the shoe 305 is presented as a three-dimensional representation, and the customer 260 is able to rotate the image to any desired orientation within all three dimensions and apply simulated lighting from any desired direction, in order to fully examine the design. In addition, the customer 260 preferably has the ability to "undo" (e.g., any or all) changes that have been made or "redo" changes that have been undone, as desired.

As indicated above, once the basic outline of a design region has been specified, the user preferably has the ability to specify design elements, contours and other design features to be applied within that region. Contours, for example, can be applied by applying a virtual base layer of uniform thickness and then virtually adding or subtracting material (e.g., using a virtual brush to add or a virtual sculpting tool to remove, respectively).

Also, although the preceding disclosure mainly focused on techniques for additive customization (i.e., applying one or more layers of additional coating material 15 to a base material 12), it should be noted that the present customization also (or instead) can involve subtractive customization, e.g., by also using a lathe or similar tool to cut material away from the shoe blank 305 (or other base material 12) in the physical production step. As indicated above, in the preferred embodiments the library of design components maintained within user interface 300 can be continually expanded, e.g., through customer submissions and/or contributions by the shoe manufacturer or seller.

It should be readily appreciated that an infinite number of customizations to a single shoe blank 305 can be created using the techniques of the present invention. Any given customization can involve dozens or even hundreds of design decisions and, therefore, there is a significant opportunity for collaboration among different individuals, either in real-time to produce a single overall design and/or sequentially to produce multiple different variations over time.

In addition to such virtual collaboration, the techniques of the present invention lend themselves quite well to a variety of in-person interactions. For instance, these interactions can take the form of a class or a group of individuals, each working at his or her workstation to custom-designed his or her own shoes, interacting socially as they do so, potentially with relatively small amounts of informal collaboration. Alternatively, they can take the form of in-person teams working together to create a single design, e.g., using multiple workstations with a shared user interface and/or with multiple designers looking at the same physical display screen and, therefore, providing their contributions in very close physical proximity to each other.

In any event, the designs produced in accordance with the present invention can be physically produced and then entered in design contests, fashion shows or other kinds of exhibits. In other words, social interactions can occur during the design phase and/or after the designs have been completed and/or physically produced. As also indicated above, any of these social interactions can be virtual (e.g., over the Internet) or in-person (e.g., at a store or other commercial location), thereby allowing people to participate however is easiest or most comfortable for them.

System Environment.

Generally speaking, except where clearly indicated otherwise, the systems, methods, functionality and techniques described above can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a FireWire connection, or using a wireless protocol, such as Bluetooth or a 802.11 protocol); software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system, which networks, in turn, in many embodiments of the invention, connect to the Internet or to any other networks; a display (such as a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive or a solid-state drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., a hard disk or solid-state drive), are downloaded into RAM, and then are executed by the CPU out of RAM. However, in some cases the process steps initially are stored in RAM or ROM.

Suitable general-purpose programmable devices for use in implementing the present invention may be obtained from various vendors. In the various embodiments, different types of devices are used depending upon the size and complexity of the tasks. Such devices can include, e.g., mainframe computers, multiprocessor computers, workstations, personal (e.g., desktop, laptop, tablet or slate) computers and/or even smaller computers, such as PDAs, wireless telephones or any other programmable appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented by a general-purpose processor executing software and/or firmware, by dedicated (e.g., logic-based) hardware, or any combination of these, with the particular implementation being selected based on known engineering tradeoffs. More specifically, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible (or non-transitory) media on which are stored software or firmware program instructions (i.e., computer-executable process instructions) for performing the methods and functionality of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

The foregoing description primarily emphasizes electronic computers and devices. However, it should be understood that any other computing or other type of device instead may be used, such as a device utilizing any combination of electronic, optical, biological and chemical processing that is capable of performing basic logical and/or arithmetic operations.

In addition, where the present disclosure refers to a processor, computer, server device, computer-readable medium or other storage device, client device, or any other kind of device, such references should be understood as encompassing the use of plural such processors, computers, server devices, computer-readable media or other storage devices, client devices, or any other devices, except to the extent clearly indicated otherwise. For instance, a server generally can be implemented using a single device or a cluster of server devices (either local or geographically dispersed), e.g., with appropriate load balancing.

ADDITIONAL CONSIDERATIONS

The discussions above primarily concern shoes and shoe components. However, it should be noted that the techniques of the present invention can be applied to a wide variety of other kinds of products. Examples include consumer products such as backpacks, water bottles, pencils, pens, cups, mugs, drinking glasses, jewelry, wristbands, eyeglass or sunglass frames, hats, purses, nondisposable grocery bags, other types of carrying bags, clothing, clothing accessories, toys, picture frames, cases and covers for wireless telephones and other small portable electronic devices, and other relatively small objects that currently are, or are desired to be, decorated or visually customized. In fact, using the techniques of the present invention a design or structure can be applied even to human skin, e.g., to create a three-dimensional (or otherwise unique) temporary or permanent tattoo.

Still further, while the preceding discussion focused on certain types of coating materials 15, different types of coating materials 15 can be used for different applications. For instance, in cases where the base material 12 is non-toxic, the coating material 15 could be a candy or other type of edible substance.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method for use in making footwear, comprising:
(a) obtaining a design for a desired three-dimensional structure;
(b) applying a pattern of coating material to a substrate, said substrate being at least one of: (i) a part of a completed shoe or (ii) a component that subsequently is used to fabricate a shoe;
(c) applying an additional pattern of coating material, on top of an existing pattern, in the form of small droplets; and
(d) repeating step (c) a plurality of times, with new patterns applied on top of previous patterns and some areas made thicker than others, so as to build up the desired three-dimensional structure on the substrate,
wherein the desired three-dimensional structure is constructed using a plurality of nozzles,
wherein said plurality of nozzles comprises a wide-dispersion nozzle and a narrower-dispersion nozzle,
wherein the narrower-dispersion nozzle has a narrower dispersion than the wide-dispersion nozzle,
wherein individual ones of said small droplets are less than 500 microns ($\mu$) in diameter,
wherein the coating material applied to the substrate is at least 50$\mu$ thick, and
wherein the desired three-dimensional structure comprises a pattern of closely spaced discrete design elements with gaps between adjacent design elements of less than 200$\mu$.

2. A method according to claim 1, wherein individual ones of said small droplets are less than 300$\mu$ in diameter.

3. A method according to claim 1, wherein the coating material used in step (b) is identical, or at least is sufficiently chemically similar to, a surface of said substrate on which said coating material is deposited so that the two are strongly bonded together and application of said coating material builds up portions of said substrate in a desired way, forming an integrated structure.

4. A method according to claim 1, wherein said pattern of coating material provides a thick layer of the coating material while said additional pattern of coating material provides finer details.

5. A method according to claim 1, wherein said substrate is part of a fully completed shoe.

6. A method according to claim 5, wherein said pattern and said additional pattern are applied with a last inserted into the fully completed shoe.

7. A method according to claim 1, wherein the desired three-dimensional structure constructed on the substrate comprises a sequin.

8. A method according to claim 1, wherein the desired three-dimensional structure constructed on the substrate comprises at least one of a faux zipper, eyelet or stitching.

9. A method according to claim 1, wherein the desired three-dimensional structure constructed on the substrate is built up around at least one removable supporting structure.

10. A method according to claim 1, wherein a sensor is used to detect variations in a surface to which at least one of the pattern or the additional pattern is to be applied, and wherein said at least one of the pattern or the additional pattern is adaptively applied based on said detected surface variations.

11. A method according to claim 10, wherein the sensor comprises a camera.

12. A method according to claim 1, wherein said plurality of nozzles is used to begin applying a second pattern before a first pattern has been fully applied.

13. A method according to claim 1, wherein the materials used for at least one of the pattern or the additional pattern comprise different types of material.

14. A method according to claim 1, wherein the materials used for at least one of the pattern or the additional pattern have different colors.

15. A method according to claim 1, wherein the coating material applied to the substrate is at least 100$\mu$ thick.

16. A method according to claim 1, wherein the coating material applied to the substrate is at least 200$\mu$ thick.

17. A method according to claim 1, wherein said shoe comprises an upper having an outer surface, and wherein the coating material covers at least 90% but not more than 98% of the outer surface of the upper.

18. A method according to claim 1, wherein in between applications of patterns of the coating material, at least one of: (a) a nozzle applying said patterns is raised or (b) a platform that supports the substrate is lowered.

19. A method according to claim 1, wherein the wide-dispersion nozzle first is used to apply a thick layer of the coating material across a large area and then the narrower-dispersion nozzle is used for creating finer details.

20. A method according to claim 1, wherein said shoe comprises an upper having an outer surface, and wherein said pattern is applied over at least 30% of the outer surface of said upper.

* * * * *